(12) United States Patent
Gugumus

(10) Patent No.: US 6,878,761 B2
(45) Date of Patent: Apr. 12, 2005

(54) SYNERGISTIC COMBINATIONS OF UV ABSORBERS FOR PIGMENTED POLYOLEFINS

(75) Inventor: François Gugumus, Allschwil (CH)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 41 days.

(21) Appl. No.: 10/358,823

(22) Filed: Feb. 5, 2003

(65) Prior Publication Data

US 2004/0030009 A1 Feb. 12, 2004

(30) Foreign Application Priority Data

Mar. 4, 2002 (EP) .............................. 02405162

(51) Int. Cl.⁷ ..................... C08K 5/3475; C08K 5/3492
(52) U.S. Cl. ........................... 524/91; 524/99; 524/100
(58) Field of Search .............................. 524/91, 99–100

(56) References Cited

U.S. PATENT DOCUMENTS

| | | | |
|---|---|---|---|
| 4,891,396 A | 1/1990 | Avar et al. ..................... 524/91 |
| 5,106,891 A | 4/1992 | Valet .......................... 524/91 |
| 5,648,488 A | * 7/1997 | Stevenson ..................... 544/215 |
| 5,798,147 A | * 8/1998 | Beck et al. ................... 427/511 |
| 6,060,543 A | 5/2000 | Bolle et al. ................... 524/100 |
| 6,545,071 B1 | 4/2003 | Gugumus ..................... 524/100 |
| 2001/0039304 A1 | 11/2001 | Gugumus ..................... 524/100 |

FOREIGN PATENT DOCUMENTS

| | | |
|---|---|---|
| EP | 0704560 | 4/1996 |
| GB | 2361005 | 10/2001 |
| WO | 97/36880 | 10/1997 |

* cited by examiner

*Primary Examiner*—Peter Szekely
(74) *Attorney, Agent, or Firm*—Sheila A. Loggins

(57) ABSTRACT

The instant invention relates to a polyolefin composition which comprises
  d) at least one organic pigment
  e) at least one sterically hindered amine light stabilizer and
  f) as UV absorber a mixture of
    a 2-hydroxyphenyl benzotriazole and a 2-hydroxyphenyl-s-triazine. Further objects of the invention are a method for stabilizing pigmented polyolefins and the use of a UV-absorber mixture of a hydroxyphenyl benzotriazole with a hydroxyphenyl-s-triazine for the stabilization of pigmented polyolefins.

11 Claims, No Drawings

SYNERGISTIC COMBINATIONS OF UV ABSORBERS FOR PIGMENTED POLYOLEFINS

The present invention relates to polyolefin compositions which contain a mixture of a hydroxyphenyl benzotriazole and a hydroxyphenyl-s-triazine UV absorber, at least one light stabilizer from the class of sterically hindered amines (HALS) and at least one organic pigment. Further objects are a method for stabilization of pigmented polyolefins and the use of a UV absorber mixture therefore.

The effects of atmospheric oxygen, moisture and, in particular, UV light result in degradation of the polymer material. This manifests itself, for example, in the loss of mechanical strength, changes in shade and finally total breakdown of the polymer article. As is known, it is possible to retard such degradation processes in polyolefins by the use of suitable stabilizers, and there are numerous prior art documents in this field.

In the coatings field, EP-A-0453 396 discloses that mixtures of hydroxyphenyl-benzotriazole with hydroxybenzophenon or with hydroxyphenyl-s-triazine UV-absorbers lead to synergistic effects which prevent the coatings life time unexpectedly long from degradation.

FR 2619 814 generically discloses the combined use of oxalamide UV absorbers, particularly in coatings, with benzophenone or benzotriazole UV absorbers, there is however no suggestion in the prior art for the instant combinations in polyolefins.

GB 2361005 discloses several combinations of UV absorbers in polyolefins, however combinations of benzotriazoles with hydroxyphenyltriazines are not mentioned.

It has now been found that combinations of benzotriazole with hydroxyphenyltriazine UV absorbers in the presence of a sterically hindered amine light stabilizer are capable of substantially preventing the degradation of pigmented polyolefins.

The combinations of the present invention provide an unexpected synergistic stabilization effect for polyolefin articles. The effect is not predictable from the absorption spectra and has so far not been observed with other UV absorber combinations in pigmented polyolefins.

One aspect of the invention is a polyolefin composition, which comprises
a) at least one organic pigment
b) at least one sterically hindered amine light stabilizer and
c) as UV absorber a mixture of
  a 2-hydroxyphenyl benzotriazole and a 2-hydroxyphenyl-s-triazine.

Suitable Polyolefins are Mentioned Below.

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE), metallocene polyethylen (m-PE) in particular m-LLDPE and metallocene poylpropylene (m-PP).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).
b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either □- or □-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE), metallocene types with conventional types (for example m-PE/PE-LLD, m-PE/PE-LD, m-PP/conventional PP).

Preferred is a polyolefin composition wherein the polyolefin is polypropylene, polyethylene or a copolymer thereof.

Particularly preferred is a polyolefin composition wherein the polyolefin is polypropylene or a copolymer thereof.

All organic pigments described in "Gächter/Müller: Plastics Additives Handbook, $3^{rd}$ Edition, Hanser Publishers, Munich Vienna New York", page 647 to 659, point 11.2.1.1 to 11.2.4.2 can be used as component a). Further suitable pigments are mentioned in Plastics Additives Handbook, $5^{th}$ Edition, edited by H. Zweifel.

Examples of organic pigments are azo pigments, anthraquinones, benzimidazolones, dioxazines, phthalocyanines, tetrachloroisoindolinones, quinacridones, isoindolines, perylenes, pyrrolo-pyrroles (diketopyrrolopyrrole, such as for example Pigment Red 254).

Examples of such organic pigments are:

C.I. (Colour Index) Pigment Yellow 93, C.I. Pigment Yellow 95, C.I. Pigment Yellow 138, C.I. Pigment Yellow 139, C.I. Pigment Yellow 155, C.I. Pigment Yellow 162, C.I. Pigment Yellow 168, C.I. Pigment Yellow 180, C.I. Pigment Yellow 183, C.I. Pigment Red 44, C.I. Pigment Red 170, C.I. Pigment Red 202, C.I. Pigment Red 214, C.I. Pigment Red 254, C.I. Pigment Red 264, C.I. Pigment Red 272, C.I. Pigment Red 48:2, C.I. Pigment Red 48:3, C.I. Pigment Red 53:1, C.I. Pigment Red 57:1, C.I. Pigment Green 7, C.I. Pigment Blue 15:1, C.I. Pigment Blue 15:3 and C.I. Pigment Violet 19.

A very suitable class is for example the class of diketopyrrolo-pyrrole pigments.

Mixtures of organic and inorganic pigments are also within the scope of the present invention. A particularly preferred inorganic pigment is titanium dioxide, which is often used in combination with an organic pigment.

When a mixture of an organic and an inorganic pigment is used the ratio of organic pigment to inorganic pigment can vary in a wide range, typically from 5:95 parts to 95:5 parts by weight.

The amount of pigment incorporated is typically from 0.1 to 15% preferably from 0.1 to 10% and more preferably from 0.1 to 5% by weight, based on the polymer.

Typical UV-absorbers of the class of hydroxyphenyl triazines are of formula (I)

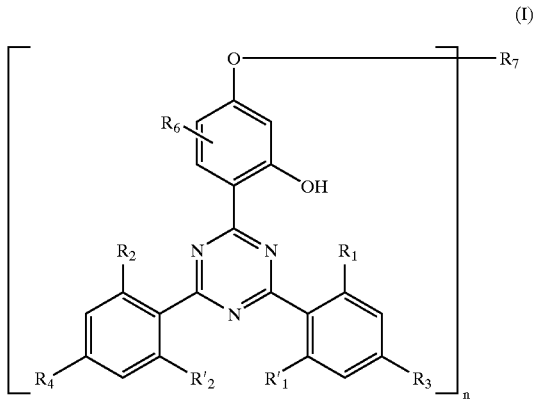

(I)

in which n is 1 or 2;

$R_1$, $R'_1$, $R_2$ and $R'_2$, independently of one another, are H, OH, $C_1$–$C_{12}$alkyl; $C_2$–$C_6$alkenyl; $C_1$–$C_{12}$alkoxy; $C_2$–$C_8$alkenoxy; halogen; trifluoromethyl; $C_7$–$C_{11}$phenylalkyl; phenyl; phenyl which is substituted by $C_1$–$C_{18}$alkyl, $C_1$–$C_{18}$alkoxy or halogen; phenoxy; or phenoxy which is substituted by $C_1$–$C_{18}$alkyl, $C_1$–$C_{18}$alkoxy or halogen;

$R_3$ and $R_4$, independently of one another, are H, $C_1$–$C_{12}$alkyl; $OR'_7$; $C_2$–$C_6$alkenyl; $C_2$–$C_{18}$alkenoxy; halogen; trifluoromethyl; $C_7$–$C_{11}$phenylalkyl; phenyl; phenyl which is substituted by $C_1$–$C_{18}$alkyl, $C_1$–$C_{18}$alkoxy or halogen; phenoxy; or phenoxy which is substituted by $C_1$–$C_{18}$alkyl, $O_1$–$C_{18}$alkoxy or halogen;

$R_6$ is hydrogen, $C_1$–$C_{24}$alkyl, $C_5$–$C_{12}$cycloalkyl or $C_7$–$C_{15}$phenylalkyl;

$R_7$, in the case where n=1, and $R'_7$, independently of one another, are hydrogen or $C_1$–$C_{18}$alkyl; or are $C_1$–$C_{12}$alkyl which is substituted by OH, $C_1$–$C_{18}$alkoxy, allyloxy, halogen, —COOH, —COOR$_8$, —CONH$_2$, —CONHR$_9$, —CON(R$_9$)(R$_{10}$), —NH$_2$, —NHR$_9$, —N(R$_9$)(R$_{10}$), —NHCOR$_{11}$, —CN, —OCOR$_{11}$, phenoxy and/or phenoxy which is substituted by $C_1$–$C_{18}$alkyl, $C_1$–$C_{18}$alkoxy or halogen; or $R_7$ is $C_3$–$C_{50}$alkyl which is interrupted by —O— and may be substituted by OH; or $R_7$ is $C_3$–$C_6$ alkenyl; glycidyl; $C_5$–$C_{12}$cycloalkyl which is substituted by OH, $C_1$–$C_4$alkyl or —OCOR$_{11}$, $C_7$–$C_{11}$phenylalkyl which is unsubstituted or substituted by OH, Cl or CH$_3$; —CO—R$_{12}$ or —SO$_2$—R$_{13}$;

$R_7$, in the case where n=2, is $C_2$–$C_6$alkylene, $C_4$–$C_2$alkenylene, xylylene, $C_3$–$C_{20}$alkylene which is interrupted by O and/or substituted by OH, or is a group of the formula —CH$_2$CH(OH)CH$_2$O—R$_{20}$—OCH$_2$CH(OH)CH$_2$—, —CO—R$_{21}$—CO—, —CO—NH—R$_{22}$—NH—CO— or —(CH$_2$)$_m$—COO—R$_{23}$—OOC—(CH$_2$)$_m$—, in which m is a number in the range from 1 to 3, or is

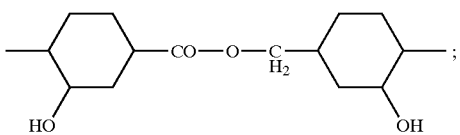

$R_8$ is $C_1$–$C_{18}$alkyl; $C_2$–$C_{18}$alkenyl; hydroxyethyl; $C_3$–$C_{50}$alkyl which is interrupted by O, NH, NR$_9$ or S and/or is substituted by OH; $C_1$–$C_4$alkyl which is substituted by —P(O)(OR$_{14}$)$_2$, —N(R$_9$)(R$_{10}$) or —OCOR$_{11}$ and/or OH; glycidyl; $O_5$–$C_{12}$cycloalkyl; phenyl; $C_7$–$C_{14}$alkylphenyl or $C_7$–$C_{11}$phenylalkyl;

$R_9$ and $R_{10}$, independently of one another, are $C_1$–$C_{12}$alkyl; $C_3$–$C_{12}$alkoxyalkyl; $C_4$–$C_{16}$dialkylaminoalkyl or $C_5$–$C_{12}$cycloalkyl, or $R_9$ and $R_{10}$ together are $C_3$–$C_9$alkylene or -oxaalkylene or -azaalkylene;

$R_{11}$ is $C_1$–$C_{18}$alkyl; $C_2$–$C_{18}$alkenyl or phenyl; $C_2$–$C_{12}$hydroxyalkyl; cyclohexyl; or is $C_3$–$C_{50}$alkyl which is interrupted by —O— and may be substituted by OH;

$R_{12}$ is $C_1$–$C_{18}$alkyl; $C_2$–$C_{18}$alkenyl; phenyl; $C_1$–$C_{18}$alkoxy; $C_3$–$C_{18}$alkenyloxy; $C_3$–$C_{50}$alkoxy which is interrupted by O, NH, NR$_9$ or S and/or substituted by OH; cyclohexyloxy; $C_7$–$C_{14}$alkylphenoxy; $C_7$–$C_{11}$phenylalkoxy; phenoxy; $C_1$–$C_{12}$alkylamino; phenylamino; tolylamino or naphthylamino;

$R_{13}$ is $C_1$–$C_{12}$alkyl; phenyl; naphthyl or $C_7$–$C_{14}$ alkylphenyl;

$R_{14}$ is $C_1$–$C_{12}$alkyl, methylphenyl or phenyl;

$R_{20}$ is $C_2$–$C_{10}$alkylene; $C_4$–$C_{50}$alkylene which is interrupted by O, phenylene or a -phenylene-X-phenylene-group, in which X is —O—, —S—, —SO$_2$—, —CH$_2$— or —C(CH$_3$)$_2$—;

$R_{21}$ is $C_2$–$C_{10}$alkylene, $C_2$–$C_{10}$oxaalkylene, $C_2$–$C_{10}$thiaalkylene, $C_6$–$C_{12}$arylene or $C_2$–$C_6$alkenylene;

$R_{22}$ is $C_2$–$C_{10}$alkylene, phenylene, tolylene, diphenylenemethane or a

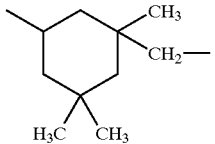

group; and $R_{23}$ is $C_2$–$C_{10}$alkylene or $C_4$–$C_{20}$alkylene which is interrupted by O.

Halogen is in all cases fluorine, chlorine, bromine or iodine.

Examples of alkyl are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl.

Examples of alkoxy having up to 12 carbon atoms are methoxy, ethoxy, propoxy, isopropoxy, butoxy, isobutoxy, pentoxy, isopentoxy, hexoxy, heptoxy, octoxy, decyloxy, dodecyloxy.

Examples of alkenoxy are propenyloxy, butenyloxy, pentenyloxy and hexenyloxy.

Examples of $C_5$–$C_{12}$cycloalkyl are cyclopentyl, cyclohexyl, cycloheptyl, cyclooctyl and cyclododecyl. $C_5$–$C_8$Cycloalkyl, especially cyclohexyl, is preferred.

$C_1$–$C_4$Alkyl-substituted $C_5$–$C_{12}$cycloalkyl is for example methylcyclohexyl or dimethylcyclohexyl.

OH— and/or $C_1$–$C_{10}$alkyl-substituted phenyl is for example methylphenyl, dimethylphenyl, trimethylphenyl, tert-butylphenyl or 3,5-di-tert-butyl-4-hydroxyphenyl.

Alkoxy-substituted phenyl is for example methoxyphenyl dimethoxyphenyl or trimethoxyphenyl.

Examples of $C_7$–$C_9$phenylalkyl are benzyl and phenylethyl.

$C_7$–$C_9$Phenylalkyl which is substituted on the phenyl radical by —OH and/or by alkyl having up to 10 carbon atoms is for example methylbenzyl, dimethylbenzyl, trimethylbenzyl, tert-butylbenzyl or 3,5-di-tert-butyl-4-hydroxybenzyl.

Examples of alkenyl are allyl, 2-methallyl, butenyl, pentenyl and hexenyl. Allyl is preferred. The carbon atom in position 1 is preferably saturated.

Examples of alkylene are methylene, ethylene, propylene, trimethylene, tetramethylene, pentamethylene, 2,2-dimethyltrimethylene, hexamethylene, trimethylhexamethylene, octamethylene and decamethylene.

Examples of alkenylene are butenylene, pentenylene and hexenylene.

$C_6$–$C_{12}$ arylene is preferably phenylene.

Alkyl interrupted by O is for example —$CH_2$—$CH_2$—O—$CH_2$—$CH_3$, —$CH_2$—$CH_2$—O—$CH_3$— or —$CH_2$—$CH_2$—O—$CH_2$—$CH_2$—O—$CH_2$—$CH_3$—. It is preferably derived from polyethlene glycol. A general description is —$((CH_2)_a$—$O)_b$—H/$CH_3$, wherein a is a number from 1 to 6 and b is a number from 2 to 10.

$C_2$–$C_{10}$ oxaalkylene and $C_2$–$C_{10}$ thiaalkylene can be deduced from the above mentioned alkylene groups by substituting one or more carbon atoms by an oxygen atom or a sulphur atom.

In a specific embodiment of the invention the hydroxyphenyl-triazine UV-absorber is of formula (Ia)

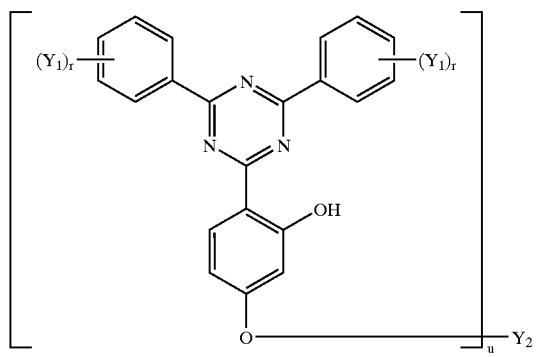

(Ia)

wherein
u is 1 or 2 and r is an integer from 1 to 3, the substituents $Y_1$ independently of one another are hydrogen, hydroxyl, halogenomethyl, alkyl having 1 to 12 carbon atoms, alkoxy having 1 to 18 carbon atoms, phenyl or halogen, if u is 1,
$Y_2$ is alkyl having 1 to 18 carbon atoms, phenoxy which is unsubstituted or substituted by hydroxyl, alkoxy having 1 to 18 carbon atoms, or halogen, or is substituted by alkyl or alkoxy having in each case 1 to 18 carbon atoms or halogen, alkyl which has 1 to 12 carbon atoms and is substituted by —COOH, —$COOY_8$, —$CONH_2$, —$CONHY_9$, —$CONY_9Y_{10}$, —$NH_2$, —$NHY_9$, —$NY_9Y_{10}$, —$NHCOY_{11}$, —CN and/or —$OCOY_{11}$, alkyl which has 4 to 20 carbon atoms, is interrupted by one or more oxygen atoms and is unsubstituted or substituted by hydroxyl or alkoxy having 1 to 12 carbon atoms, alkenyl having 3 to 6 carbon atoms, glycidyl, cyclohexyl which is unsubstituted or substituted by hydroxyl, alkyl having 1 to 4 carbon atoms and/or —$OCOY_{11}$, phenylalkyl which has 1 to 5 carbon atoms in the alkyl moiety and is unsubstituted or substituted by hydroxyl, chlorine and/or methyl, —$COY_{12}$ or —$SO_2Y_{13}$, or,
if u is 2,
$Y_2$ is alkylene having 2 to 16 carbon atoms, alkenylene having 4 to 12 carbon atoms, xylylene, alkylene which has 3 to 20 carbon atoms, is interrupted by one or more —O— atoms and/or is substituted by hydroxyl, —$CH_2CH(OH)CH_2$—O—$Y_{15}$—$OCH_2CH(OH)CH_2$, —CO—$Y_{16}$—CO—, —CO—NH—$Y_{17}$—NH—CO— or —$(CH_2)$, —$CO_2$—$Y_{18}$—OCO—$(CH_2)_m$, in which m is 1, 2 or 3,
$Y_8$ is alkyl having 1 to 18 carbon atoms, alkenyl having 3 to 18 carbon atoms, alkyl which has 3 to 20 carbon atoms, is interrupted by one or more oxygen or sulfur atoms or —$NT_6$- and/or is substituted by hydroxyl, alkyl which has 1 to 4 carbon atoms and is substituted by —$P(O)(OY_{14})_2$, —$NY_9Y_{10}$ or —$OCOY_{11}$ and/or hydroxyl, alkenyl having 3 to 18 carbon atoms, glycidyl, or phenylalkyl having 1 to 5 carbon atoms in the alkyl moiety,
$Y_9$ and $Y_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, or $Y_9$ and $Y_{10}$ together are alkylene, oxaalkylene or azaalkylene having in each case 3 to 9 carbon atoms,
$Y_{11}$ is alkyl having 1 to 18 carbon atoms, alkenyl having 2 to 18 carbon atoms or phenyl,
$Y_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino,
$Y_{13}$ is alkyl having 1 to 18 carbon atoms, phenyl or alkylphenyl having 1 to 8 carbon atoms in the alkyl radical,
$Y_{14}$ is alkyl having 1 to 12 carbon atoms or phenyl,
$Y_{15}$ is alkylene having 2 to 10 carbon atoms, phenylene or a group -phenylene-M-phenylene- in which M is —O—, —S—, —$SO_2$—, —$CH_2$— or —$C(CH_3)_2$—,
$Y_{16}$ is alkylene, oxaalkylene or thiaalkylene having in each case 2 to 10 carbon atoms, phenylene or alkenylene having 2 to 6 carbon atoms,
$Y_{17}$ is alkylene having 2 to 10 carbon atoms, phenylene or alkylphenylene having 1 to 11 carbon atoms in the alkyl moiety, and
$Y_{18}$ is alkylene having 2 to 10 carbon atoms or alkylene which has 4 to 20 carbon atoms and is interrupted once or several times by oxygen.

Further preferred polyolefin compositions are those, in which, in the compounds of the formula (Ia), the substituents $Y_1$ are hydrogen, alkyl having 1 to 12 carbon atoms, alkoxy having 1 to 18 carbon atoms, phenyl or halogen, if u is 1, $Y_2$ is alkyl having 1 to 18 carbon atoms, alkyl which has 1 to 12 carbon atoms and is substituted by hydroxyl, alkoxy having 1 to 18 carbon atoms, —$COOY_8$, —$CONY_9Y_{10}$ and/or —$OCOY_{11}$, glycidyl or phenylalkyl having 1 to 4 carbon atoms in the alkyl moiety, or, if u is 2, $Y_2$ is alkylene having 2 to 16 carbon atoms, alkenylene having 4 to 12 carbon atoms, xylylene or alkylene which has 3 to 20 carbon atoms, is interrupted by one or more —O— atoms and/or is substituted by hydroxyl, the substituents $Y_8$ to $Y_{11}$ being as defined above.

Preferably u is 1.

Typical individual compounds are the following:
2,4,6-tris(2-hydroxy-4-octyloxyphenyl)-1,3,5-triazine, 2-(2-hydroxy-4-octyloxyphenyl)-4,6-bis-(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2- hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)-phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxy-phenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

Particularly preferred are the following compounds.

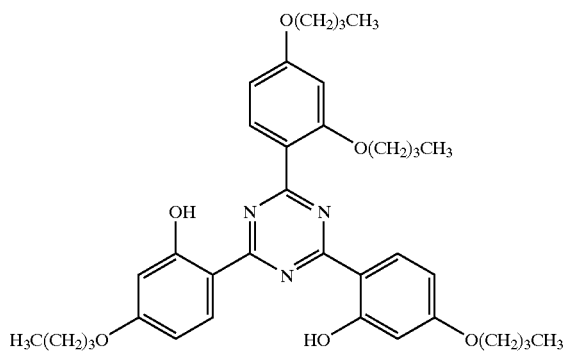

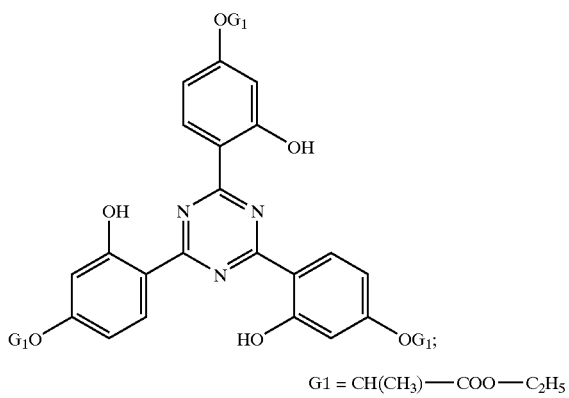

G1 = CH(CH$_3$)—COO—C$_2$H$_5$

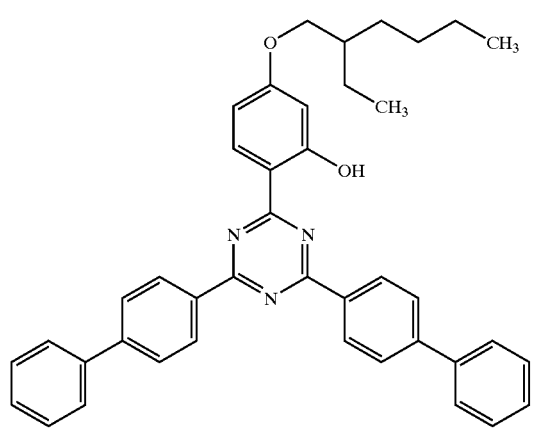

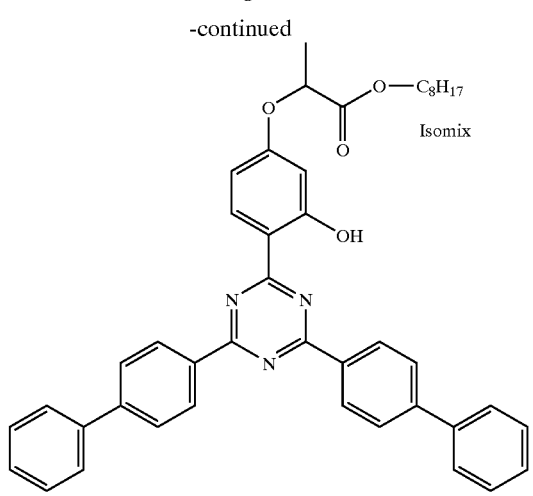

= a mixture of a) R1 = R2 = CH(CH$_3$)—COO—C$_8$H$_{17}$, R3 = R4 = H;
b) R1 = R2 = R3 = CH(CH$_3$)—COO—C$_8$H$_{17}$, R4 = H;
c) R1 = R2 = R3 = R4 = CH(CH$_3$)—COO—C$_8$H$_{17}$

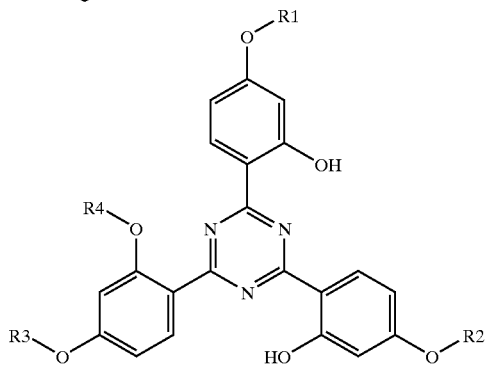

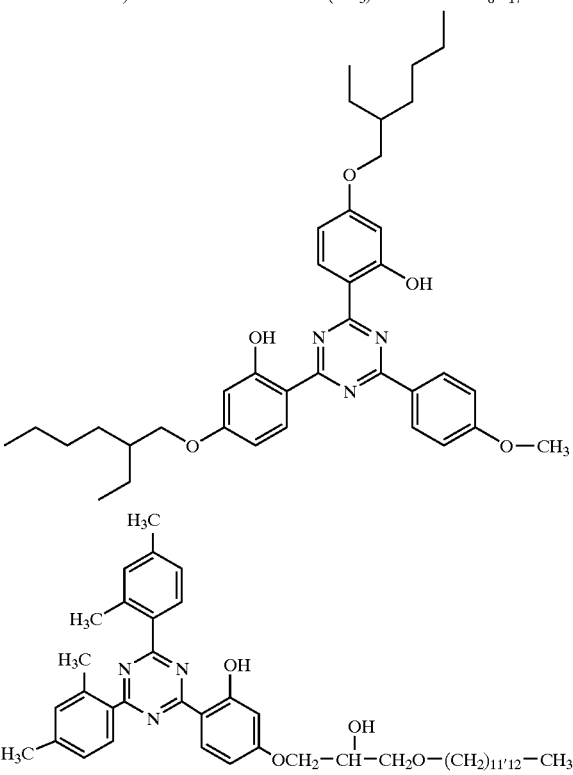

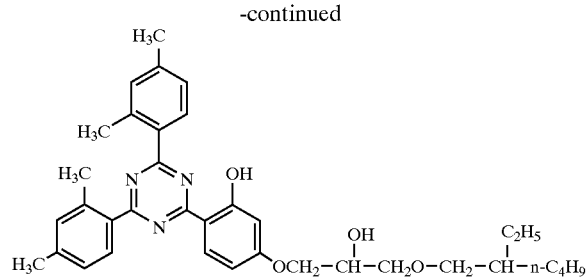

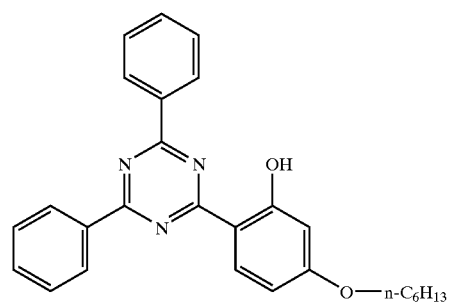

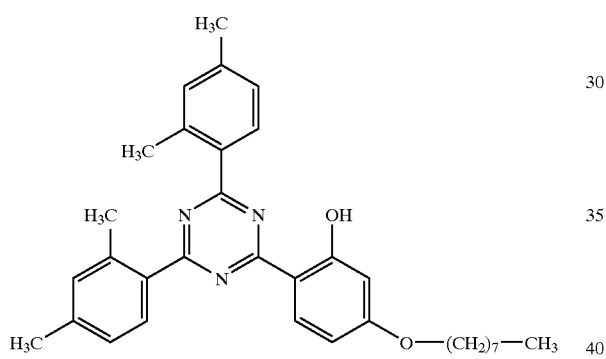

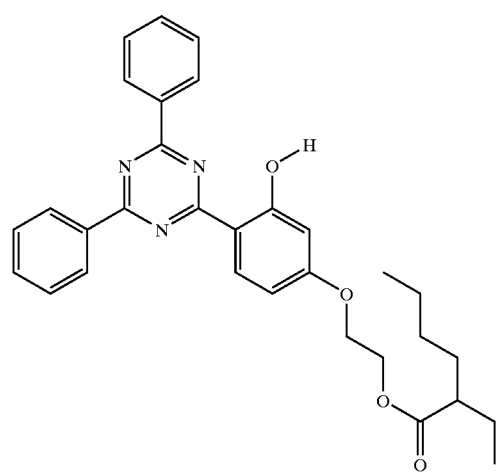

The hydroxyphenyl triazine UV-absorbers are known and partially items of commerce.

Suitable examples for hydroxyphenyl benzotriazole UV absorbers are compounds of the following structure IIa, IIb or IIc.

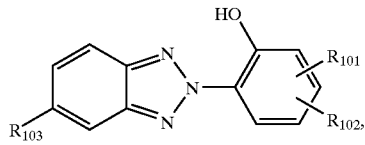

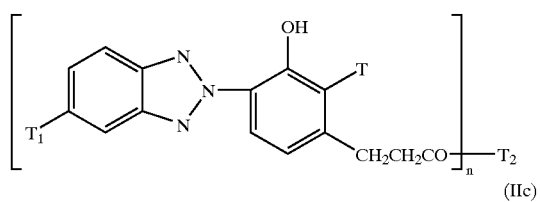

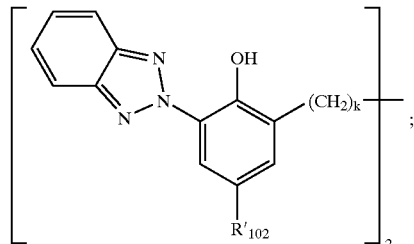

in the compounds of the formula (IIa), $R_{101}$ is hydrogen, alkyl having 1 to 24 carbon atoms, phenylalkyl having 1 to 4 carbon atoms in the alkyl moiety, cycloalkyl having 5 to 8 carbon atoms or a radical of the formula

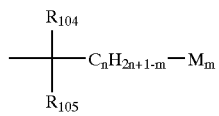

in which $R_{104}$ and $R_{105}$ independently of one another are alkyl having in each case 1 to 5 carbon atoms, or $R_{104}$, together with the radical $C_nH_{2n+1-m}$, forms a cycloalkyl radical having 5 to 12 carbon atoms, m is 1 or 2, n is an integer from 2 to 20 and M is a radical of the formula —$COOR_{106}$ in which $R_{106}$ is hydrogen, alkyl having 1 to 12 carbon atoms, alkoxyalkyl having in each case 1 to 20 carbon atoms in the alkyl moiety and in the alkoxy moiety or phenylalkyl having 1 to 4 carbon atoms in the alkyl moiety, $R_{102}$ is hydrogen, halogen, alkyl having 1 to 18 carbon atoms, and phenylalkyl having 1 to 4 carbon atoms in the alkyl moiety, and $R_{103}$ is hydrogen, chlorine, alkyl or alkoxy having in each case 1 to 4 carbon atoms or —$COOR_{106}$ in which $R_{106}$ is as defined above;

in the compounds of the formula (IIb)

T is hydrogen or alkyl having 1 to 6 carbon atoms, $T_1$ is hydrogen, chlorine or alkyl or alkoxy having in each case 1 to 4 carbon atoms, n is 1 or 2 and, if n is 1, $T_2$ is chlorine or a radical of the formula —$OT_3$ or

and,
if n is 2, $T_2$ is a radical of the formula

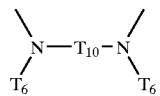

or —O-$T_9$-O— in which
$T_3$ is hydrogen, alkyl which has 1 to 18 carbon atoms and is unsubstituted or substituted by 1 to 3 hydroxyl groups or by —$OCOT_6$, alkyl which has 3 to 18 carbon atoms, is interrupted once or several times by —O— or —$NT_6$- and is unsubstituted or substituted by hydroxyl or —$OCOT_6$, cycloalkyl which has 5 to 12 carbon atoms and is unsubstituted or substituted by hydroxyl and/or alkyl having 1 to 4 carbon atoms, alkenyl which has 2 to 18 carbon atoms and is unsubstituted or substituted by hydroxyl, phenylalkyl having 1 to 4 carbon atoms in the alkyl moiety, or a radical of the formula —$CH_2CH(OH)$-$T_7$ or

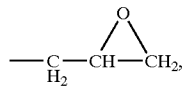

$T_4$ and $T_5$ independently of one another are hydrogen, alkyl having 1 to 18 carbon atoms, alkyl which has 3 to 18 carbon atoms and is interrupted once or several times by —O— or —$NT_6$-, cycloalkyl having 5 to 12 carbon atoms, phenyl, phenyl which is substituted by alkyl having 1 to 4 carbon atoms, alkenyl having 3 to 8 carbon atoms, phenylalkyl having 1 to 4 carbon atoms in the alkyl moiety or hydroxyalkyl having 2 to 4 carbon atoms,
$T_6$ is hydrogen, alkyl having 1 to 18 carbon atoms, cycloalkyl having 5 to 12 carbon atoms, alkenyl having 3 to 8 carbon atoms, phenyl, phenyl which is substituted by alkyl having 1 to 4 carbon atoms, phenylalkyl having 1 to 4 carbon atoms in the alkyl moiety,
$T_7$ is hydrogen, alkyl having 1 to 18 carbon atoms, phenyl which is unsubstituted or substituted by hydroxyl, phenylalkyl having 1 to 4 carbon atoms in the alkyl moiety, or —$CH_2OT_8$,
$T_8$ is alkyl having 1 to 18 carbon atoms, alkenyl having 3 to 8 carbon atoms, cycloalkyl having 5 to 10 carbon atoms, phenyl, phenyl which is substituted by alkyl having 1 to 4 carbon atoms, or phenylalkyl having 1 to 4 carbon atoms in the alkyl moiety,
$T_9$ is alkylene having 2 to 8 carbon atoms, alkenylene having 4 to 8 carbon atoms, alkynylene having 4 carbon atoms, cyclohexylene, alkylene which has 2 to 8 carbon atoms and is interrupted once or several times by —O—, or a radical of the formula —$CH_2CH(OH)CH_2OT_{11}OCH_2CH(OH)CH_2$— or —$CH_2$—$C(CH_2OH)_2$—$CH_2$—,
$T_{10}$ is alkylene which has 2 to 20 carbon atoms and can be interrupted once or several times by —O—, or cyclohexylene,
$T_{11}$ is alkylene having 2 to 8 carbon atoms, alkylene which has 2 to 18 carbon atoms and is interrupted once or several times by —O—, 1,3-cyclohexylene, 1,4-cyclohexylene, 1,3-phenylene or 1,4-phenylene, or $T_{10}$ and $T_6$, together with the two nitrogen atoms, are a piperazine ring;
in the compounds of formula (IIc)
$R'_{102}$ is $C_1$–$C_{12}$alkyl and k is a number from 1 to 4.
In the compounds of the formula (IIa) $R_{101}$ can be hydrogen or alkyl having 1 to 24 carbon atoms, such as methyl, ethyl, propyl, butyl, hexyl, octyl, nonyl, dodecyl, tetradecyl, hexadecyl, octadecyl, nonadecyl and eicosyl and also corresponding branched isomers.
Furthermore, in addition to phenylalkyl having 1 to 4 carbon atoms in the alkyl moiety, for example benzyl, $R_{101}$ can also be cycloalkyl having 5 to 8 carbon atoms, for example cyclopentyl, cyclohexyl and cyclooctyl, or a radical of the formula

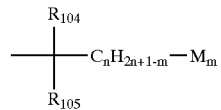

in which $R_{104}$ and $R_{105}$ independently of one another are alkyl having in each case 1 to 5 carbon atoms, in particular methyl, or $R_{104}$, together with the $C_nH_{2n+1-m}$ radical, forms a cycloalkyl radical having 5 to 12 carbon atoms, for example cyclohexyl, cyclooctyl and cyclodecyl. M is a radical of the formula —$COOR_{106}$ in which $R_{106}$ is not only hydrogen but also alkyl having 1 to 12 carbon atoms or alkoxyalkyl having 1 to 20 carbon atoms in each of the alkyl and alkoxy moieties. Suitable alkyl radicals $R_{106}$ are those enumerated for $R_{101}$. Examples of suitable alkoxyalkyl groups are —$C_2H_4OC_2H_5$, —$C_2H_4OC_8H_{17}$ and —$C_4H_8OC_4H_9$. As phenylalkyl having 1 to 4 carbon atoms, $R_{106}$ is, for example, benzyl, cumyl, α-methylbenzyl or phenylbutyl.
In addition to hydrogen and halogen, for example chlorine and bromine, $R_{102}$ can also be alkyl having 1 to 18 carbon atoms. Examples of such alkyl radicals are indicated in the definitions of $R_{101}$. $R_{102}$ can also be phenylalkyl having 1 to 4 carbon atoms in the alkyl moiety, for example benzyl, α-methylbenzyl and cumyl.
Halogen as a substituent means in all cases fluorine, chlorine, bromine or iodine, preferably chlorine or bromine and more preferably chlorine.
At least one of the radicals $R_{101}$ and $R_{102}$ must be other than hydrogen.
In addition to hydrogen or chlorine, $R_{103}$ is also alkyl or alkoxy having in each case 1 to 4 carbon atoms, for example methyl, butyl, methoxy and ethoxy, and also —$COOR_{106}$.
In the compounds of the formula (IIb) T is hydrogen or alkyl having 1 to 6 carbon atoms, such as methyl and butyl, $T_1$ is not only hydrogen or chlorine, but also alkyl or alkoxy having in each case 1 to 4 carbon atoms, for example methyl, methoxy and butoxy, and, if n is 1, $T_2$ is chlorine or a radical of the formula —$OT_3$ or —$NT_4T_5$. $T_3$ is here hydrogen or alkyl having 1 to 18 carbon atoms (cf. the definition of $R_{101}$). These alkyl radicals can be substituted by 1 to 3 hydroxyl groups or by a radical —$OCOT_6$. Furthermore, $T_3$ can be alkyl having 3 to 18 carbon atoms (cf. the definition of $R_{101}$) which is interrupted once or several times by —O— or —$NT_6$- and is unsubstituted or substituted by hydroxyl or —$OCOT_6$. Examples of $T_3$ as cycloalkyl are cyclopentyl, cyclohexyl or cyclooctyl. $T_3$ can also be alkenyl having 2 to 18 carbon atoms. Suitable alkenyl radicals are derived from the alkyl radicals enumerated in the definitions of $R_{101}$. These alkenyl radicals can be substituted by hydroxyl. Examples of $T_3$ as phenylalkyl are benzyl, phenylethyl, cumyl, α-methylbenzyl or benzyl. $T_3$ can also be a radical of the formula —$CH_2CH(OH)$-$T_7$ or

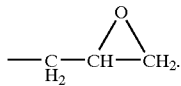

Like $T_3$, $T_4$ and $T_5$ can, independently of one another, be not only hydrogen but also alkyl having 1 to 18 carbon atoms or alkyl which has 3 to 18 carbon atoms and is interrupted once or several times by —O— or —$NT_6$-. $T_4$ and $T_5$ can also be cycloalkyl having 5 to 12 carbon atoms, for example cyclopentyl, cyclohexyl and cyclooctyl. Examples of $T_4$ and $T_5$ as alkenyl groups can be found in the illustrations of $T_3$. Examples of $T_4$ and $T_5$ as phenylalkyl having 1 to 4 carbon atoms in the alkyl moiety are benzyl or phenylbutyl. Finally, these substituents can also be hydroxyalkyl having 1 to 3 carbon atoms.

If n is 2, $T_2$ is a divalent radical of the formula

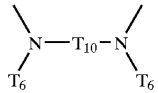

or —O-$T_9$-O—.

In addition to hydrogen, $T_6$ (see above also) is alkyl, cycloalkyl, alkenyl, aryl or phenylalkyl; examples of such radicals have already been given above.

In addition to hydrogen and the phenylalkyl radicals and long-chain alkyl radicals mentioned above, $T_7$ can be phenyl or hydroxyphenyl and also —$CH_2OT_8$ in which $T_8$ can be one of the alkyl, alkenyl, cycloalkyl, aryl or phenylalkyl radicals enumerated.

The divalent radical $T_9$ can be alkylene having 2 to 8 carbon atoms, and such radicals can also be branched. This also applies to the alkenylene and alkynylene radicals $T_9$. As well as cyclohexylene, $T_9$ can also be a radical of the formula —$CH_2CH(OH)CH_2OT_{11}OCH_2CH(OH)CH_2$— or —$CH_2$—$C(CH_2OH)_2$—$CH_2$—.

$T_{10}$ is a divalent radical and, in addition to cyclohexylene, is also alkylene which has 2 to 20 carbon atoms and which can be interrupted once or several times by —O—. Suitable alkylene radicals are derived from the alkyl radicals mentioned in the definitions of $R_{101}$.

$T_{11}$ is also an alkylene radical. It contains 2 to 8 carbon atoms or, if it is interrupted once or several times by —O—, 4 to 10 carbon atoms. $T_{11}$ is also 1,3-cyclohexylene, 1,4-cyclohexylene, 1,3-phenylene or 1,4-phenylene.

Together with the two nitrogen atoms, $T_6$ and $T_{10}$ can also be a piperazine ring.

Preferred is a compound of the formula (IIa), wherein $R_{101}$ is hydrogen or alkyl having 1 to 20 carbon atoms, $R_{102}$ is hydrogen, alkyl having 1 to 18 carbon atoms or phenylalkyl having 1 to 4 carbon atoms in the alkyl moiety and $R_{103}$ is hydrogen, chlorine or alkyl having 1 to 4 carbon atoms.

Particularly preferred is a compound of formula (IIa) in which $R_{101}$ is in the ortho-position relative to the hydroxyl group and is hydrogen or alkyl having 4 to 12 carbon atoms, $R_{102}$ is in the para-position relative to the hydroxyl group and is alkyl having 1 to 6 carbon atoms or cumyl and $R_{103}$ is hydrogen or chlorine.

The UV absorbers of the formulae (I), (Ia), (IIa), (IIb), (IIc) are known per se and are described, together with their preparation, in, for example, WO 96/28431, EP-A-323 408, EP-A-57 160, U.S. Pat. No. 5,736,597 (EP-A-434 608) and U.S. Pat. No. 4,619,956. Preferred meanings of substituents and individual compounds can be deduced from the documents mentioned.

Particularly preferred compounds are the following:

2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)-benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenyl-benzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol, 300; [R—$CH_2CH$—COO—$CH_2CH_2$–$]_2$ where R=3'-tert-butyl-4'-hydroxy-5'-2H-benzotriazol-2-ylphenyl, 2-[2'-hydroxy-3'-(α,α-di-methylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole.

The UV-absorbers are typically incorporated in an amount of 0.005 to 5% each by weight based on the polymer. The total amount of UV absorber is preferably from 0.01 to 5%, more preferably from 0.05 to 2% and most preferably from 0.05 to 1% by weight, based on the weight of the polyolefin. The weight ratio of hydroxyphenyl triazine UV-absorber to hydroxy-phenyl benzotriazole UV-absorber is preferably from 10:1 to 1:10, more preferably from 5:1 to 1:5 and most preferably from 2:1 to 1:2.

Particularly preferred mixtures are the following:

a)

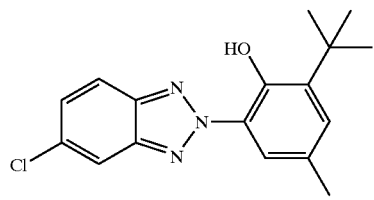

Tinuvin 326 and

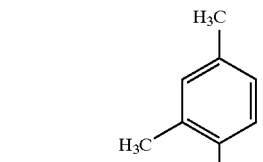

Cyasorb UV 1164, b)

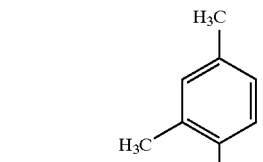

Tinuvin 327 and

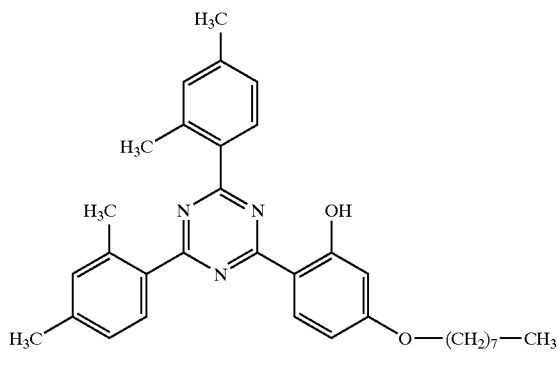

Cyasorb UV 1164, c)

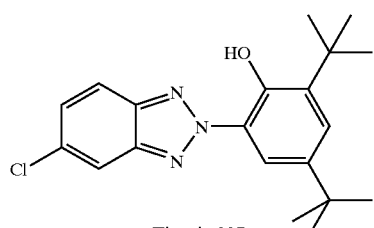

Tinuvin 328 and

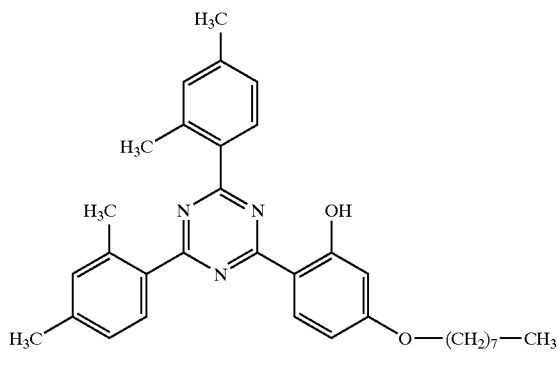

Cyasorb UV 1164, d) Tinuvin 326 and

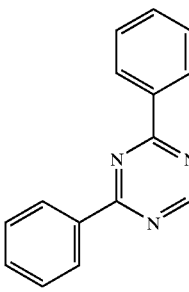

Tinuvin 1577, e) Tinuvin 327 and Tinuvin 1577,
f) Tinuvin 328 and Tinuvin 1577, g) Tinuvin 326 and

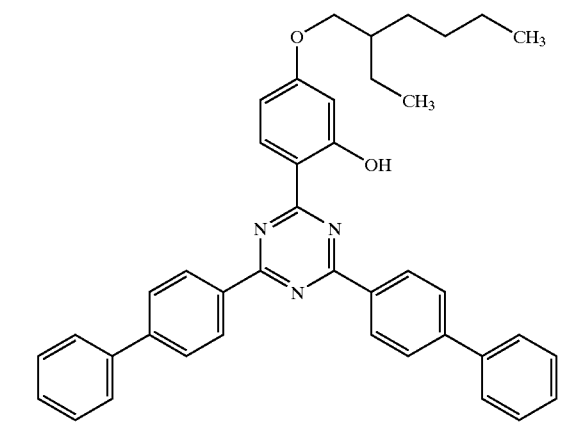

compound 101, h) Tinuvin 327 and compound 101,
i) Tinuvin 328 and compound 101.

The preparation of compound 101 and analogously substituted triazines is for example disclosed in WO 96/28431.

The sterically hindered amine light stabilizer useful in the instant invention is preferably a compound of formulae (A-1) to (A-10) or of formulae (B-1) to (B-10);

(α-1) a Compound of the Formula (A-1)

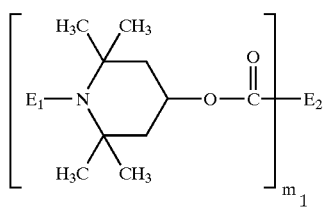

(A-1)

in which $E_1$ is hydrogen, $C_1$–$C_8$alkyl, $O^-$, —OH, —$CH_2CN$, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl,
$m_1$ is 1, 2 or 4,
if $m_1$ is 1, $E_2$ is $C_1$–$C_{25}$alkyl,
if $m_1$ is 2, $E_2$ is $C_1$–$C_{14}$alkylene or a group of the formula (a-I)

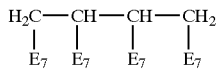

(a-I)

wherein $E_3$ is $C_1$–$C_{10}$ alkyl or $C_2$–$C_{10}$alkenyl, $E_4$ is $C_1$–$C_{10}$alkylene, and
$E_5$ and $E_6$ independently of one another are $C_1$–$C_4$alkyl, cyclohexyl or methylcyclohexyl, and
if $m_1$ is 4, $E_2$ is $C_4$–$C_{10}$alkanetetrayl;

(α-2) a Compound of the Formula (A-2)

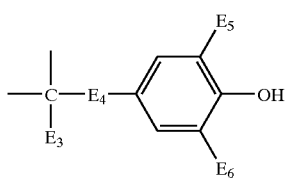

(A-2)

in which two of the radicals $E_7$ are —COO—($C_1$–$C_{20}$alkyl), and
two of the radicals $E_7$ are a group of the formula (a-II)

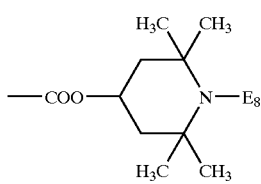

(a-II)

with $E_8$ having one of the meanings of $E_1$;

(α-3) a Compound of the Formula (A-3)

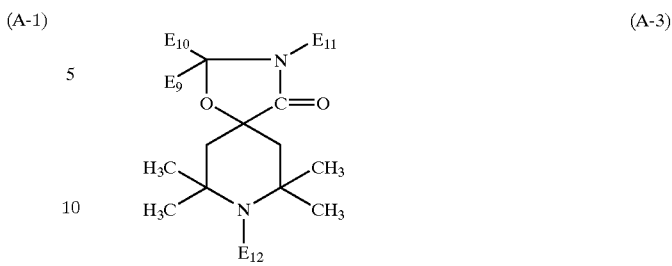

(A-3)

in which
$E_9$ and $E_{10}$ together form $C_2$–$C_{14}$alkylene,
$E_{11}$ is hydrogen or a group —$Z_1$—COO-$Z_2$,
$Z_1$ is $C_2$–$C_{14}$alkylene, and
$Z_2$ is $C_1$–$C_{24}$alkyl, and
$E_{12}$ has one of the meanings of $E_1$;

(α-4) a Compound of the Formula (A-4)

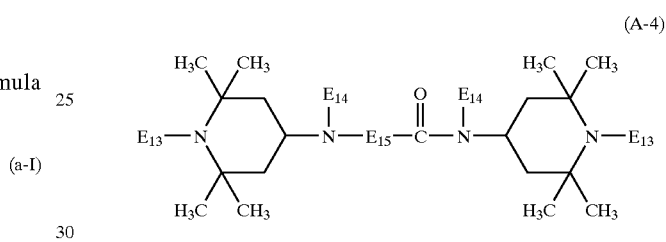

(A-4)

wherein
the radicals $E_{13}$ independently of one another have one of the meanings of $E_1$,
the radicals $E_{14}$ independently of one another are hydrogen or $C_1$–$C_{12}$alkyl, and
$E_{15}$ is $C_1$–$C_{10}$alkylene or $C_3$–$C_{10}$alkylidene;

(α-5) a Compound of the Formula (A-5)

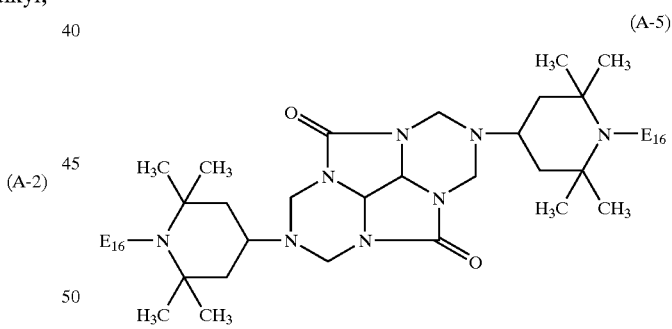

(A-5)

wherein
the radicals $E_{16}$ independently of one another have one of the meanings of $E_1$;

(α-6) a Compound of the Formula (A-6)

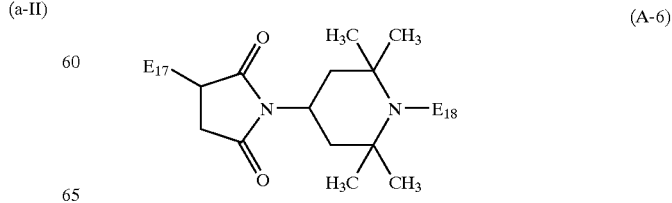

(A-6)

in which
$E_{17}$ is $C_1$–$C_{24}$alkyl, and
$E_{18}$ has one of the meanings of $E_1$;

(α-7) a Compound of the Formula (A-7)

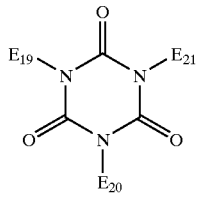

(A-7)

in which
$E_{19}$, $E_{20}$ and $E_{21}$ independently of one another are a group of the formula (a-III)

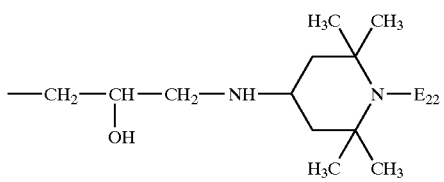

(a-III)

wherein $E_{22}$ has one of the meanings of $E_1$;

(α-8) a Compound of the Formula (A-8)

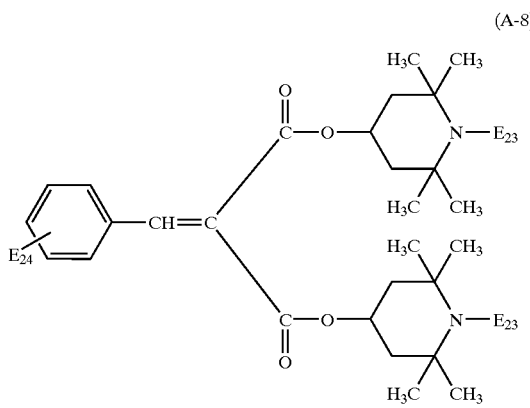

(A-8)

wherein
the radicals $E_{23}$ independently of one another have one of the meanings of $E_1$,
and $E_{24}$ is hydrogen, $C_1$–$C_{12}$alkyl or $C_1$–$C_{12}$alkoxy;

(α-9) a Compound of the Formula (A-9)

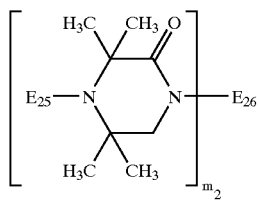

(A-9)

wherein
$m_2$ is 1, 2 or 3,
$E_{25}$ has one of the meanings of $E_1$, and
when $m_2$ is 1, $E_{26}$ is a group

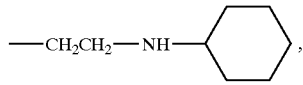

when $m_2$ is 2, $E_{26}$ is $C_2$–$C_{22}$alkylene, and
when $m_2$ is 3, $E_{26}$ is a group of the formula (a-IV)

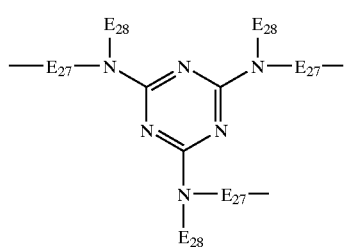

(a-IV)

wherein the radicals $E_{27}$ independently of one another are $C_2$–$C_{12}$alkylene, and the radicals $E_{28}$ independently of one another are $C_1$–$C_{12}$alkyl or $C_5$–$C_{12}$cycloalkyl;

(α-10) a Compound of the Formula (A-10)

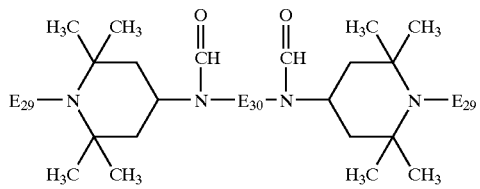

(A-10)

wherein
the radicals $E_{29}$ independently of one another have one of the meanings of $E_1$, and
$E_{30}$ is $C_2$–$C_{22}$alkylene, $C_5$–$C_7$cycloalkylene, $C_1$–$C_4$alkylenedi($C_5$–$C_7$cycloalkylene), phenylene or phenylenedi($C_1$–$C_4$alkylene);

(β-1) a Compound of the Formula (B-1)

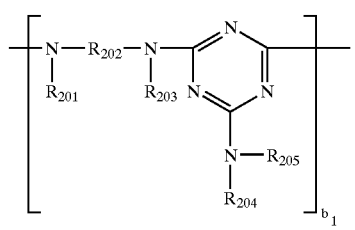

(B-1)

in which
$R_{201}$; $R_{203}$, $R_{204}$ and $R_{205}$ independently of one another are hydrogen, $C_1$–$C_{12}$alkyl, $C_5$–$C_{12}$cycloalkyl, $C_1$–$C_4$-alkyl-substituted $C_5$–$C_{12}$cycloalkyl, phenyl, phenyl which is substituted by —OH and/or $C_1$–$C_{10}$alkyl; $C_7$–$C_9$phenylalkyl, $C_7$–$C_9$phenylalkyl which is substituted on the phenyl radical by —OH and/or $C_1$–$C_{10}$alkyl; or a group of the formula (b-I)

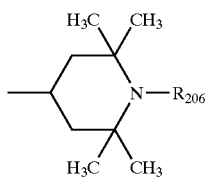

(b-I)

$R_{202}$ is $C_2$–$C_{18}$alkylene, $C_5$–$C_7$cycloalkylene or $C_1$–$C_4$alkylenedi($B_5$–$C_7$cycloalkylene), or the radicals $R_{201}$, $R_{202}$ and $R_{203}$, together with the nitrogen atoms to which they are bonded, perform a 5- to 10-membered heterocyclic ring, or $R_{204}$ and $R_{205}$, together with the nitrogen atom to which they are bonded, form a 5- to 10-membered heterocyclic ring, $R_{206}$ is hydrogen, $C_1$–$C_8$alkyl, $O^-$, —OH, —CH$_2$CN, $C_1$–$C_{18}$alkoxy, $C_5$–$C_{12}$cycloalkoxy, $C_3$–$C_6$alkenyl, $C_7$–$C_9$phenylalkyl unsubstituted or substituted on the phenyl by 1, 2 or 3 $C_1$–$C_4$alkyl; or $C_1$–$C_8$acyl, and $b_1$ is a number from 2 to 50, with the proviso that at least one of the radicals $R_{201}$, $R_{203}$, $R_{204}$ and $R_{205}$ is a group of the formula (b-I);

(β-2) a Compound of the Formula (B-2)

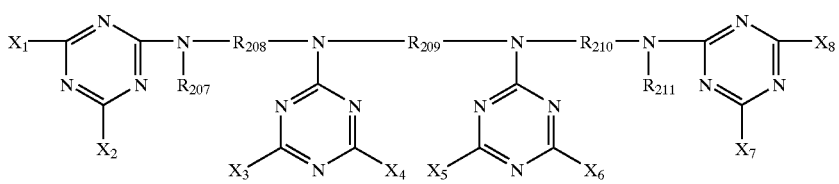

wherein $R_{207}$ and $R_{211}$ independently of one another are hydrogen or $C_1$–$C_{12}$alkyl, $R_{208}$, $R_{209}$ and $R_{210}$ independently of one another are $C_2$–$C_{10}$alkylene, and $X_1$, $X_2$, $X_3$, $X_4$, $X_5$, $X_6$, $X_7$ and $X_8$ independently of one another are a group of the formula (b-II),

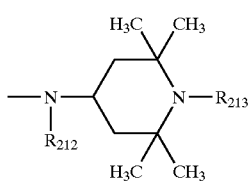

(b-II)

in which $R_{212}$ is hydrogen, $C_1$–$C_{12}$alkyl, $C_5$–$C_{12}$cycloalkyl, $C_1$–$C_4$alkyl-substituted $C_5$–$C_{12}$cycloalkyl, phenyl, —OH— and/or $C_1$–$C_{10}$alkyl-substituted phenyl, $C_7$–$C_9$phenylalkyl, $C_7$–$C_9$phenylalkyl which is substituted on the phenyl radical by —OH and/or $C_1$–$C_{10}$alkyl; or a group of the formula (b-I) as defined above, and $R_{213}$ has one of the meanings of $R_{206}$;

(β-3) a Compound of the Formula (B-3)

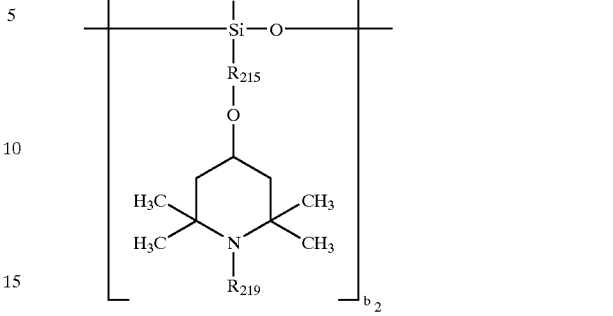

in which $R_{214}$ is $C_1$–$C_{10}$alkyl, $C_5$–$C_{12}$cycloalkyl, $C_1$–$C_4$alkyl-substituted $C_5$–$C_{12}$cycloalkyl, phenyl or $C_1$–$C_{10}$alkyl-substituted phenyl, $R_{215}$ is $C_3$–$C_{10}$alkylene, $R_{216}$ has one of the meanings of $R_{206}$, and $b_2$ is a number from 2 to 50;

(β-4) a Compound of the Formula (B-4)

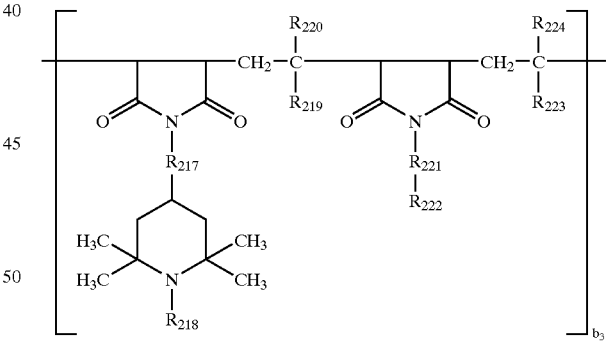

in which $R_{217}$ and $R_{221}$ independently of one another are a direct bond or a —N($X_9$)—CO—$X_{10}$—CO—N($X_{11}$)— group, where $X_9$ and $X_{11}$ independently of one another are hydrogen, $C_1$–$C_8$alkyl, $C_5$–$C_{12}$cycloalkyl, phenyl, $C_7$–$C_9$phenylalkyl or a group of the formula (b-I), $X_{10}$ is a direct bond or $C_1$–$C_4$alkylene, $R_{218}$ has one of the meanings of $R_{206}$, $R_{219}$, $R_{220}$, $R_{223}$ and $R_{224}$ independently of one another are hydrogen, $C_1$–$C_{30}$alkyl, $C_5$–$C_{12}$cycloalkyl or phenyl, $R_{222}$ is hydrogen, $C_1$–$C_{30}$alkyl, $C_5$–$C_{12}$cycloalkyl, phenyl, $C_7$–$C_9$phenylalkyl or a group of the formula (b-I), and $b_3$ is a number from 1 to 50;

(β-5) a Compound of the Formula (B-5)

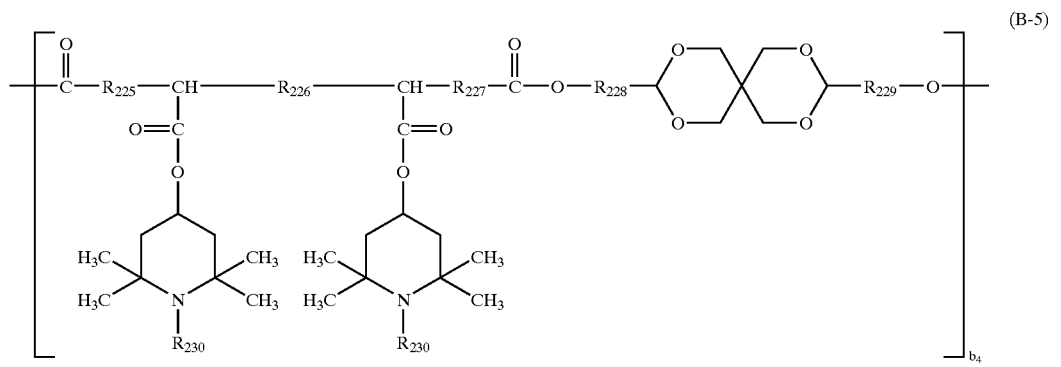

in which $R_{225}$, $R_{226}$, $R_{227}$, $R_{228}$ and $R_{229}$ independently of one another are a direct bond or $C_1$–$C_{10}$alkylene, $R_{230}$ has one of the meanings of $R_{206}$, and $b_4$ is a number from 1 to 50;

(β-6) a product (B-6) obtainable by reacting a product, obtained by reaction of a polyamine of the formula (B-6-1) with cyanuric chloride, with a compound of the formula (B-6-2)

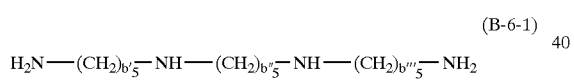

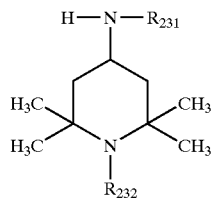

in which $b'_5$, $b''_5$ and $b'''_5$ independently of one another are a number from 2 to 12, $R_{231}$ is hydrogen, $C_1$–$C_{12}$alkyl, $C_5$–$C_{12}$cycloalkyl, phenyl or $C_7$–$C_9$phenylalkyl, and $R_{232}$ has one of the meanings of $R_{206}$;

(β-7) a Compound of the Formula (B-7)

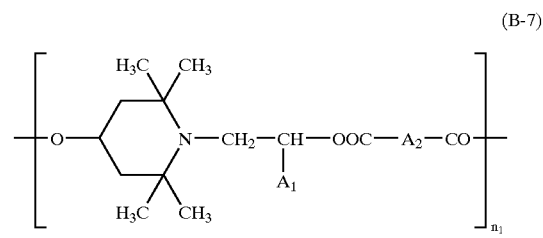

wherein $A_1$ is hydrogen or $C_1$–$C_4$alkyl,
$A_2$ is a direct bond or $C_1$–$C_{10}$alkylene, and
$n_1$ is a number from 2 to 50;

(β-8) at Least One Compound of the Formulae (B-8-a) and (B-8-b)

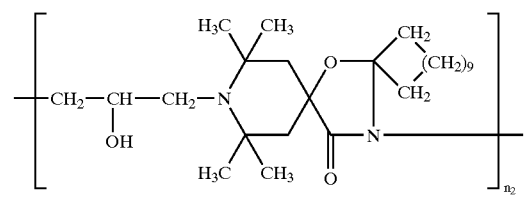

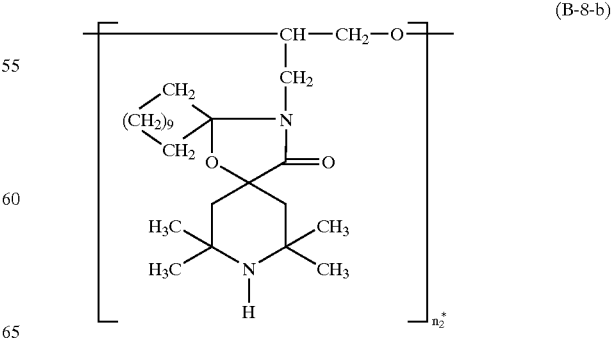

wherein $n_2$ and $n_2^*$ are a number from 2 to 50;

(β-9) a Compound of the Formula (B-9)

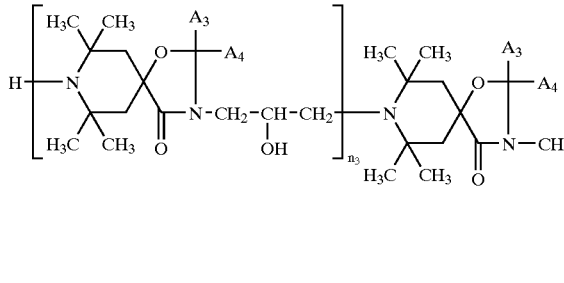
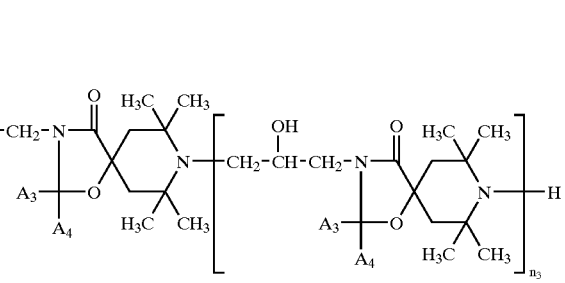

(B-9)

wherein $A_3$ and $A_4$ independently of one another are hydrogen or $C_1$–$C_8$alkyl, or $A_3$ and $A_4$ together form a $C_2$–$C_{14}$alkylene group, and
the variables $n_3$ independently of one another are a number from 1 to 50; and (β-10) a Compound of the Formula (B-10)

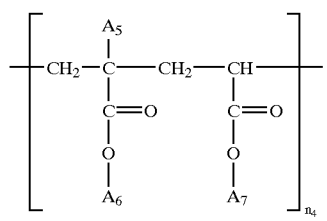

(B-10)

wherein $n_4$ is a number from 2 to 50,
$A_5$ is hydrogen or $C_1$–$C_4$alkyl,
the radicals $A_6$ and $A_7$ independently of one another are $C_1$–$C_4$alkyl or a group of the formula (b-I), with the proviso that at least 50% of the radicals $A_7$ are a group of the formula (b-I).

Examples of alkyl having up to 30 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethyl-butyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl, docosyl and triacontyl. One of the preferred definitions of $E_1$, $E_8$, $E_{12}$, $E_{13}$, $E_{16}$, $E_{18}$, $E_{22}$, $E_{23}$, $E_{25}$, $E_{29}$, $R_{206}$, $R_{213}$, $R_{216}$, $R_{218}$, $R_{230}$ and $R_{232}$ is $C_1$–$C_4$alkyl, especially methyl. $R_{231}$ is preferably butyl.

Examples of alkoxy having up to 18 carbon atoms are methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy. One of the preferred meanings of $E_1$ is octoxy. $E_{24}$ is preferably $C_1$–$C_4$alkoxy and one of the preferred meanings of $R_{206}$ is propoxy.

Examples of $C_5$–$C_{12}$cycloalkyl are cyclopentyl, cyclohexyl, cycloheptyl, cyclooctyl and cyclododecyl. $C_5$–$C_8$Cycloalkyl, especially cyclohexyl, is preferred.

$C_1$–$C_4$Alkyl-substituted $C_5$–$C_{12}$cycloalkyl is for example methylcyclohexyl or dimethylcyclohexyl.

Examples of $C_5$–$C_{12}$cycloalkoxy are cyclopentoxy, cyclohexoxy, cycloheptoxy, cyclooctoxy, cyclodecyloxy and cyclododecyloxy. $C_5$–$C_8$Cycloalkoxy, in particular cyclopentoxy and cyclohexoxy, is preferred.

—OH— and/or $C_1$–$C_{10}$alkyl-substituted phenyl is for example methylphenyl, dimethylphenyl, trimethylphenyl, tert-butylphenyl or 3,5-di-tert-butyl-4-hydroxyphenyl.

Examples of $C_7$–$C_9$phenylalkyl are benzyl and phenylethyl.

$C_7$–$C_9$Phenylalkyl which is substituted on the phenyl radical by —OH and/or by alkyl having up to 10 carbon atoms is for example methylbenzyl, dimethylbenzyl, trimethylbenzyl, tert-butylbenzyl or 3,5-di-tert-butyl-4-hydroxybenzyl.

Examples of alkenyl having up to 10 carbon atoms are allyl, 2-methallyl, butenyl, pentenyl and hexenyl. Allyl is preferred. The carbon atom in position 1 is preferably saturated.

Examples of acyl containing not more than 8 carbon atoms are formyl, acetyl, propionyl, butyryl, pentanoyl, hexanoyl, heptanoyl, octanoyl, acryloyl, methacryloyl and benzoyl. $C_1$–$C_8$Alkanoyl, $C_3$–$C_8$alkenyl and benzoyl are preferred. Acetyl and acryloyl are especially preferred.

Examples of alkylene having up to 22 carbon atoms are methylene, ethylene, propylene, trimethylene, tetramethylene, pentamethylene, 2,2-dimethyltrimethylene, hexamethylene, trimethylhexamethylene, octamethylene and decamethylene.

An example of $C_3$–$C_{10}$alkylidene is the group

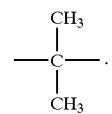

An example of $O_4$—$C_{10}$alkanetetrayl is 1,2,3,4-butanetetrayl.

An example of $C_5$–$C_7$cycloalkylene is cyclohexylene.

An example of $C_1$–$C_4$alkylenedi($C_5$–$C_7$cycloalkylene) is methylenedicyclohexylene.

An example of phenylenedi($C_1$–$C_4$alkylene) is methylene-phenylene-methylene or ethylene-phenylene-ethylene.

Where the radicals $R_{201}$, $R_{202}$ and $R_{203}$, together with the nitrogen atoms to which they are attached, form a 5- to 10-membered heterocyclic ring, this ring is for example

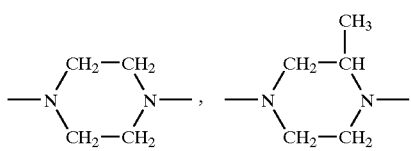

A 6-membered heterocyclic ring is preferred.

Where the radicals $R_{204}$ and $R_{205}$, together with the nitrogen atom to which they are attached, form a 5- to 10-membered heterocyclic ring, this ring is for example 1-pyrrolidyl, piperidino, morpholino, 1-piperazinyl, 4-methyl-1-piperazinyl, 1-hexahydroazepinyl, 5,5,7-trimethyl-1-homopiperazinyl or 4,5,5,7-tetramethyl-1-homopiperazinyl. Morpholino is particularly preferred.

One of the preferred definitions of $R_{219}$ and $R_{223}$ is phenyl.

$R_{226}$ is preferably a direct bond.

$n_1$, $n_2$, $n_2{}^*$ and $n_4$ are preferably a number from 2 to 25, in particular 2 to 20.

$n_3$ is preferably a number from 1 to 25, in particular 1 to 20.

$b_1$ and $b_2$ are preferably a number from 2 to 25, in particular 2 to 20.

$b_3$ and $b_4$ are preferably a number from 1 to 25, in particular 1 to 20.

$b'_5$ and $b''_5$ are preferably 3 and $b'''_5$ is preferably 2.

The compounds described above are essentially known and commercially available. All of them can be prepared by known processes.

The preparation of the compounds is disclosed, for example, in U.S. Pat. No. 5,679,733, U.S. Pat. No. 3,640,928, U.S. Pat. No. 4,198,334, U.S. Pat. No. 5,204,473, U.S. Pat. No. 4,619,958, U.S. Pat. No. 4,110,306, U.S. Pat. No. 4,110,334, U.S. Pat. No. 4,689,416, U.S. Pat. No. 4,408,051, SU-A-768,175 (Derwent 88-138,751/20), U.S. Pat. No. 5,049,604, U.S. Pat. No. 4,769,457, U.S. Pat. No. 4,356,307, U.S. Pat. No. 4,619,956, U.S. Pat. No. 5,182,390, GB-A-2,269,819, U.S. Pat. No. 4,292,240, U.S. Pat. No. 5,026,849, U.S. Pat. No. 5,071,981, U.S. Pat. No. 4,547,538, U.S. Pat. No. 4,976,889, U.S. Pat. No. 4,086,204, U.S. Pat. No. 6,046,304, U.S. Pat. No. 4,331,586, U.S. Pat. No. 4,108,829, U.S. Pat. No. 5,051,458, WO-A-94/12,544 (Derwent 94-177,274/22), DD-A-262,439 (Derwent 89-122,983/17), U.S. Pat. No. 4,857,595, U.S. Pat. No. 4,529,760, U.S. Pat. No. 4,477,615, CAS 136,504-96-6, U.S. Pat. No. 4,233,412, U.S. Pat. No. 4,340,534, WO-A-98/51,690 and EP-A-1,803.

The product (B-6) can be prepared analogously to known processes, for example by reacting a polyamine of formula (B-6-1) with cyanuric chloride in a molar ratio of from 1:2 to 1:4 in the presence of anhydrous lithium carbonate, sodium carbonate or potassium carbonate in an organic solvent such as 1,2-dichloroethane, toluene, xylene, benzene, dioxane or tert-amyl alcohol at a temperature of from −20° C. to +10° C., preferably from −10° C. to +10° C., in particular from 0° C. to +10° C., for from 2 to 8 hours, followed by reaction of the resultant product with a 2,2,6,6-tetramethyl-4-piperidylamine of the formula (B-6-2). The molar ratio of the 2,2,6,6-tetramethyl-4-piperidylamine to polyamine of the formula (B-6-1) employed is for example from 4:1 to 8:1. The quantity of the 2,2,6,6-tetramethyl-4-piperidylamine can be added in one portion or in more than one portion at intervals of a few hours.

The molar ratio of polyamine of the formula (B-6-1) to cyanuric chloride to 2,2,6,6-tetramethyl-4-piperidylamine of the formula (B-6-2) is preferably from 1:3:5 to 1:3:6.

The following example indicates one way of preparing a preferred product (B-6-a).

EXAMPLE 23.6 g (0.128 mol) of cyanuric chloride, 7.43 g (0.0426 mol) of N,N'-bis[3-aminopropyl]ethylenediamine and 18 g (0.13 mol) of anhydrous potassium carbonate are reacted at 5° C. for 3 hours with stirring in 250 ml of 1,2-dichloroethane. The mixture is warmed at room temperature for a further 4 hours. 27.2 g (0.128 mol) of N-(2,2,6,6-tetramethyl-4-piperidyl)butylamine are added and the resultant mixture is warmed at 60° C. for 2 hours. A further 18 g (0.13 mol) of anhydrous potassium carbonate are added and the mixture is warmed at 60° C. for a further 6 hours. The solvent is removed by distillation under a slight vacuum (200 mbar) and replaced by xylene. 18.2 g (0.085 mol) of N-(2,2,6,6-tetramethyl-4-piperidyl)butylamine and 5.2 g (0.13 mol) of ground sodium hydroxide are added, the mixture is heated at reflux for 2 hours and, for a further 12 hours, the water formed during the reaction is removed by azeotropic distillation. The mixture is filtered. The solution is washed with water and dried over $Na_2SO_4$. The solvent is evaporated and the residue is dried at 120–130° C. in vacuo (0.1 mbar). The desired product is obtained as a colourless resin.

In general, the product (B-6) can, for example, be represented by a compound of the formula (B-6-α), (B-6-β) or (B-6-γ). It can also be in the form of a mixture of these three compounds.

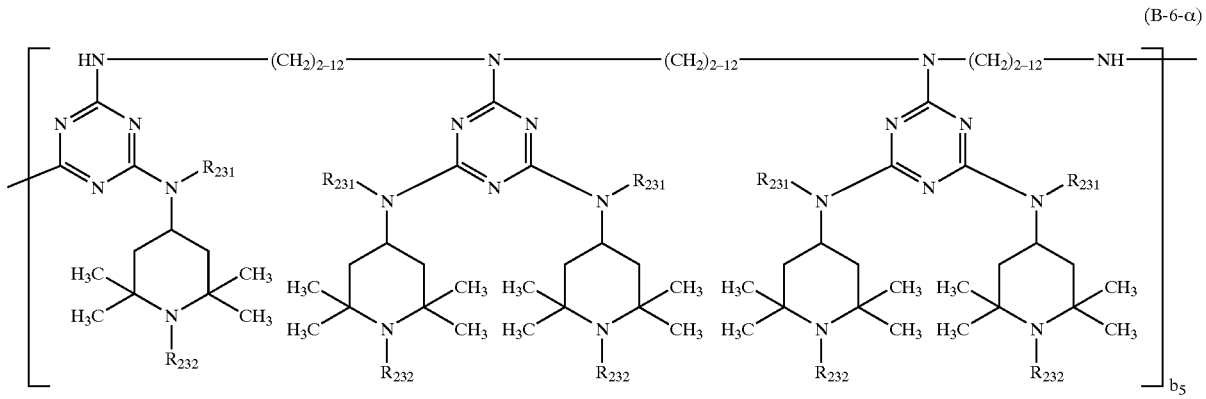

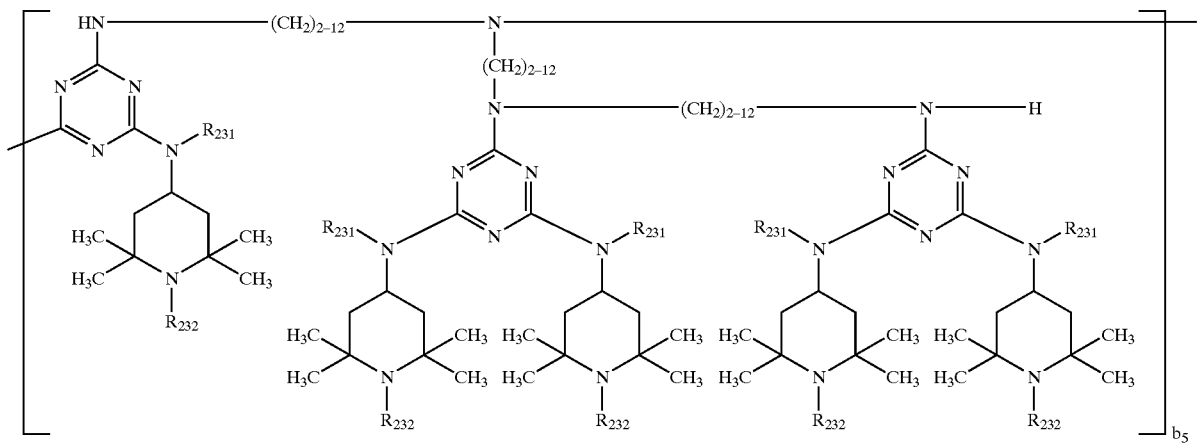
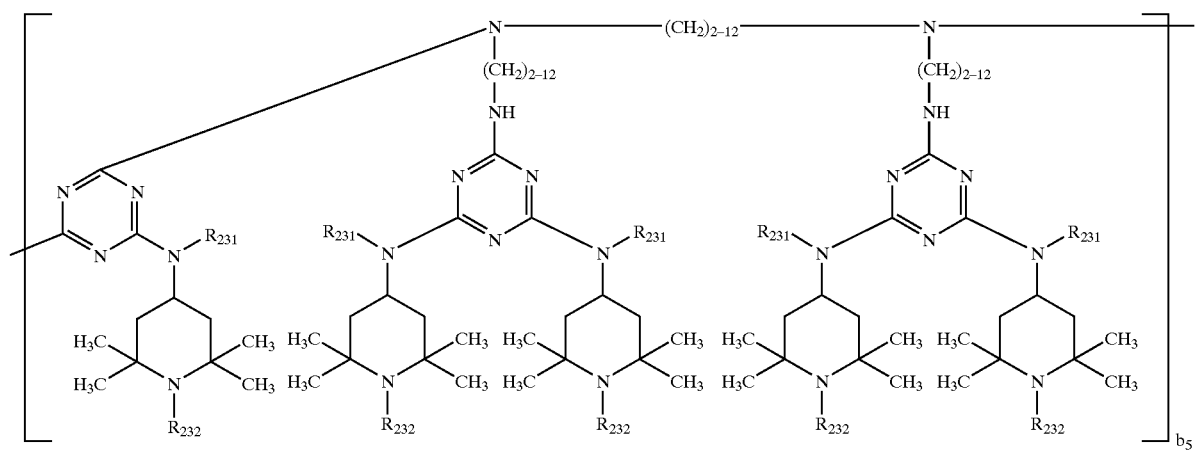
A preferred meaning of the formula (B-6-α) is
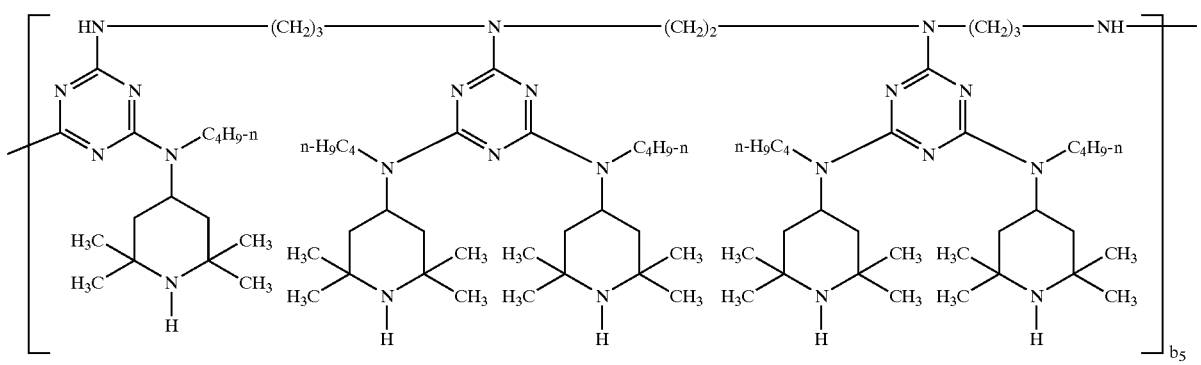

A preferred meaning of the formula (B-6-β) is

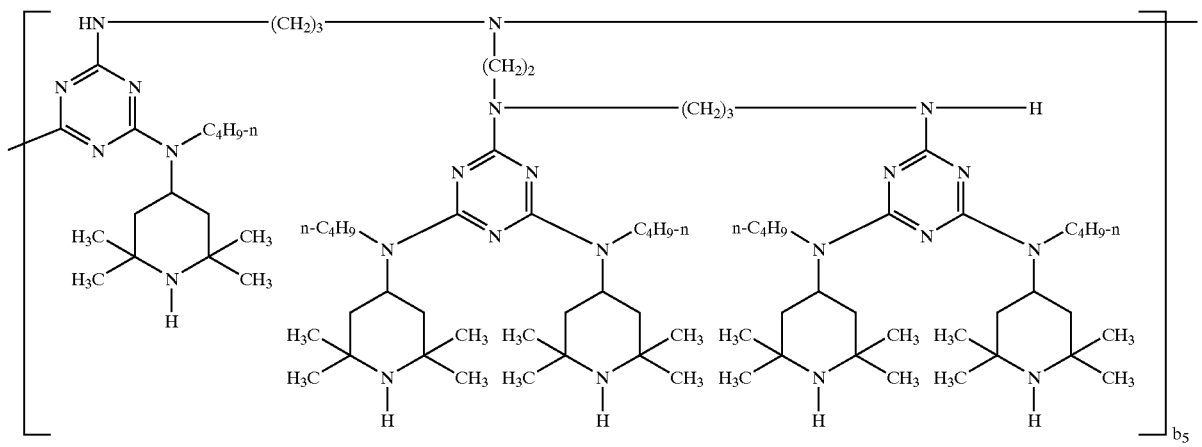

A preferred meaning of the formula (B-6-γ) is

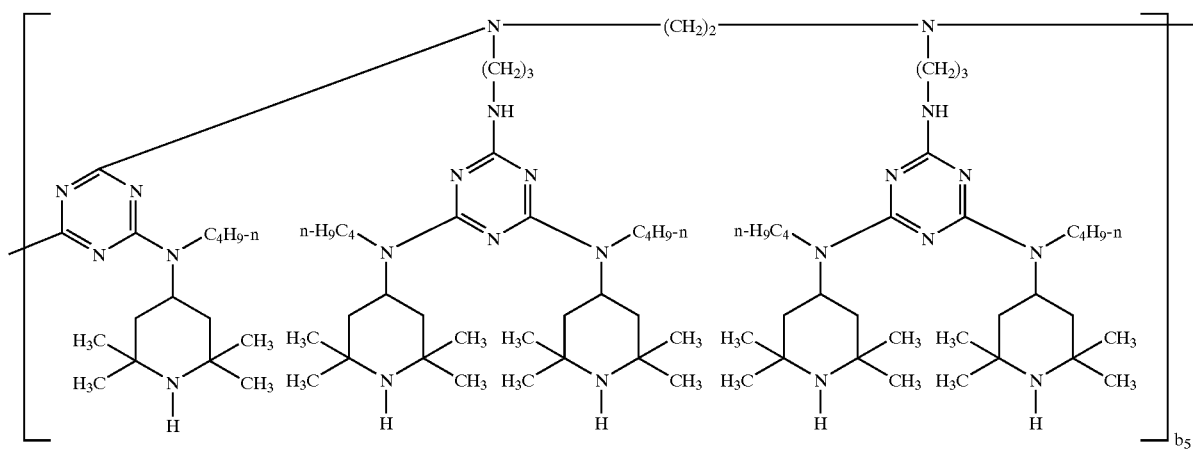

In the above formulae (B-6-α) to (B-6-γ), $b_5$ is preferably 2 to 20, in particular 2 to 10.

The sterically hindered amine compounds of component (c) are preferably selected from the group consisting of the following commercial products: DASTIB 845 (RTM), TINUVIN 770 (RTM), TINUVIN 765 (RTM), TINUVIN 144 (RTM), TINUVIN 123 (RTM), TINUVIN 111 (RTM), TINUVIN 783 (RTM), TINUVIN 791 (RTM), MARK LA 52 (RTM), MARK LA 57 (RTM), MARK LA 62 (RTM), MARK LA 67 (RTM), HOSTAVIN N 20 (RTM), HOSTAVIN N 24 (RTM), SANDUVOR 3050 (RTM), DIACETAM 5 (RTM), SUMISORB TM 61 (RTM), UVINUL 4049 (RTM), SANDUVOR PR 31(RTM), GOODRITE UV 3034 (RTM), GOODRITE UV 3150 (RTM), GOODRITE UV 3159 (RTM), GOODRITE 3110×128 (RTM), UVINUL 4050 H (RTM), CHIMASSORB 944 (RTM), CHIMASSORB 2020 (RTM), CYASORB UV 3346 (RTM), CYASORB UV 3529 (RTM), DASTIB 1082 (RTM), CHIMASSORB 119 (RTM), UVASIL 299 (RTM), UVASIL 125 (RTM), UVASIL 2000 (RTM), UVINUL 5050H (RTM), LICHTSCHUTZSTOFF UV 31 (RTM), LUCHEM HA B 18 (RTM), MARK LA 63 (RTM), MARK LA 68 (RTM), UVASORB HA 88 (RTM), TINUVIN 622 (RTM), HOSTAVIN N 30 (RTM) and FERRO AM 806 (RTM).

Particularly preferred are TINUVIN 770 (RTM), TINUVIN 791 (RTM), TINUVIN 622 (RTM), TINUVIN 783 (RTM), CHIMASSORB 944 (RTM), CHIMASSORB 2020 (RTM) and CHIMASSORB 119 (RTM).

Most preferred is Tinuvin 770 (RTM) and TINUVIN 791 (RTM).

The meanings of the terminal groups which saturate the free valences in the compounds of the formulae (B-1), (B-3), (B-4), (B-5), (B-6-α), (B-6-β), (B-6-γ), (B-7), (B-8-a), (B-8-b) and (B-10) depend on the processes used for their preparation. The terminal groups can also be modified after the preparation of the compounds.

If the compounds of the formula (B-1) are prepared by reacting a compound of the formula

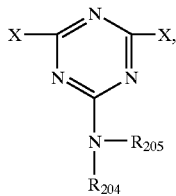

in which X is, for example, halogen, in particular chlorine, and $R_{204}$ and $R_{205}$ are as defined above, with a compound of the formula

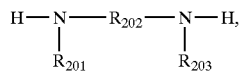

in which $R_{201}$, $R_{202}$ and $R_{203}$ are as defined above, the terminal group bonded to the diamino radical is hydrogen or

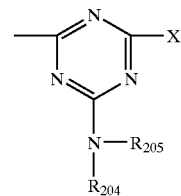

and the terminal group bonded to the triazine radical is X or

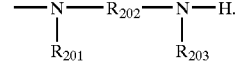

If X is halogen, it is advantageous to replace this, for example, by —OH or an amino group when the reaction is complete. Examples of amino groups which may be mentioned are pyrrolidin-1-yl, morpholino, —NH$_2$, —N(C$_1$–C$_8$)alkyl)$_2$ and —NR(C$_1$–C$_8$alkyl), in which R is hydrogen or a group of the formula (b-I).

The compounds of the formula (B-1) also cover compounds of the formula

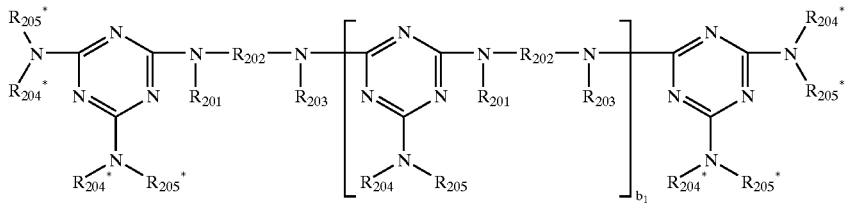

wherein $R_{201}$, $R_{202}$, $R_{203}$, $R_{204}$, $R_{205}$ and $b_1$ are as defined above and $R_{204}{}^*$ has one of the meanings of $R_{204}$ and $R_{205}{}^*$ has one of the meanings of $R_{205}$.

One of the particularly preferred compounds of the formula (B-1) is

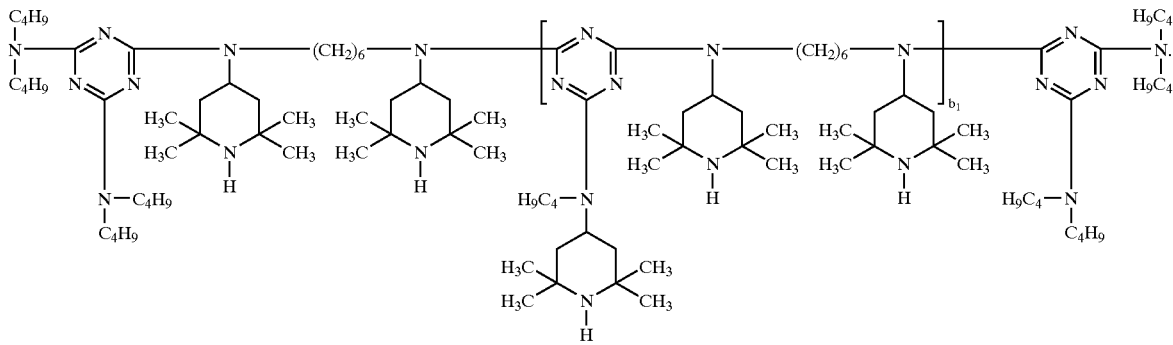

The preparation of this compound is described in Example 10 of U.S. Pat. No. 6,046,304.

In the compounds of the formula (B-3), the terminal group bonded to the silicon atom can be, for example, (R$_{14}$)$_3$Si—O—, and the terminal group bonded to the oxygen can be, for example, —Si(R$_{14}$)$_3$.

The compounds of the formula (B-3) can also be in the form of cyclic compounds if $b_2$ is a number from 3 to 10, i.e. the free valences shown in the structural formula then form a direct bond.

In the compounds of the formula (B-4), the terminal group bonded to the 2,5-dioxopyrrolidine ring is, for example, hydrogen, and the terminal group bonded to the —C($R_{223}$)($R_{224}$)— radical is, for example,

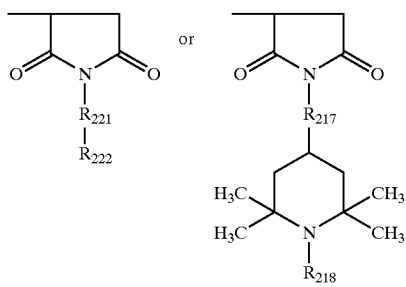

In the compounds of the formula (B-5), the terminal group bonded to the carbonyl radical is, for example,

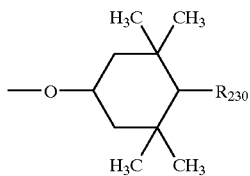

and the terminal group bonded to the oxygen radical is, for example,

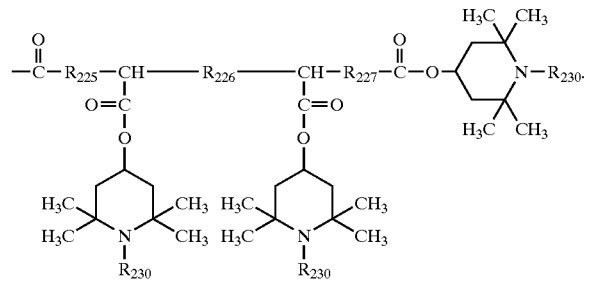

In the compounds of the formulae (B-6-α), (B-6-β) and (B-6-γ), the terminal group bonded to the triazine radical is, for example, Cl or a

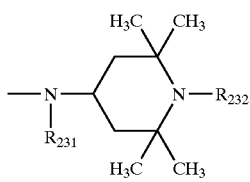

group, and the terminal group bonded to the amino radical is, for example, hydrogen or a

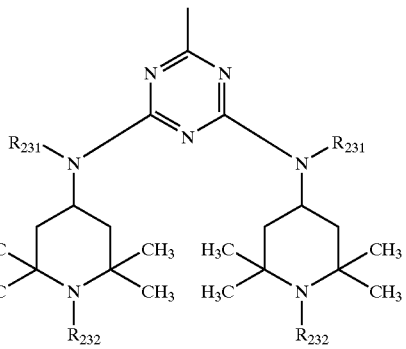

group.

If the compounds of the formula (B-7) are prepared, for example, by reacting a compound of the formula

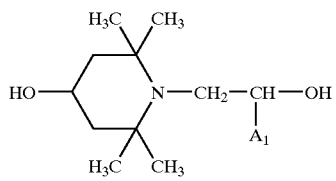

in which $A_1$ is hydrogen or methyl, with a dicarboxylic acid diester of the formula Y—OOC-$A_2$-COO—Y, in which Y is, for example, methyl, ethyl or propyl, and $A_2$ is as defined above, the terminal group bonded to the 2,2,6,6-tetramethyl-4-oxypiperidin-1-yl radical is hydrogen or —CO-$A_2$-COO—Y, and the terminal group bonded to the diacyl radical is —O—Y or

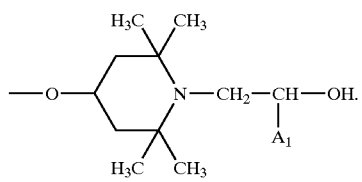

In the compounds of the formula (B-8-a), the terminal group bonded to the nitrogen can be, for example, hydrogen and the terminal group bonded to the 2-hydroxypropylene radical can be, for example, a

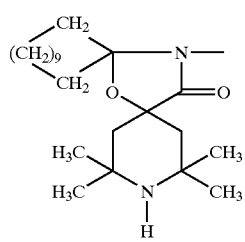

group.

In the compounds of the formula (B-8-b), the terminal group bonded to the dimethylene radical can be, for example, —OH, and the terminal group bonded to the oxygen can be, for example, hydrogen. The terminal groups can also be polyether radicals.

In the compounds of the formula (B-10), the end group bonded to the —$CH_2$— residue can be, for example, hydrogen and the end group bonded to the —CH($CO_2A_7$) residue can be, for example, —CH═CH—COO$A_7$.

Further individual individual compounds are the following: bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxy-benzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]-decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecyl-succinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

In a specific embodiment of the invention the pigment is selected from the class consisting of diketopyrrolo-pyrrole pigments, the UV absorber is a mixture of Tinuvin 327 (RTM) and Tinuvin 1577 (RTM), the sterically hindered amine stabilizer is Tinuvin 791 (RTM) or Tinuvin 770 (RTM) and the substrate is polypropylene.

The amount of the sterically hindered amine compound (component (c)) in the polyolefin to be stabilized is preferably 0.005 to 5%, in particular 0.01 to 1% or 0.05 to 1% by weight, based on the weight of the polyolefin.

The stabilized material may additionally also contain various conventional additives, for example:

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3- hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenylpropionyl]oxy)ethyl]oxamide (Naugard® XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl) sebacate, 2,2,6,6-tetramethylpiperidin-4-one, 2,2,6,6-tetramethylpiperidin-4-ol.

2. UV Absorbers and Light Stabilisers 2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-p-methyl-β-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,4-di-cumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:
Tris(2,4-di-tert-butylphenyl) phosphite (Irgafose® 168, Ciba-Geigy), tris(nonylphenyl) phosphite,

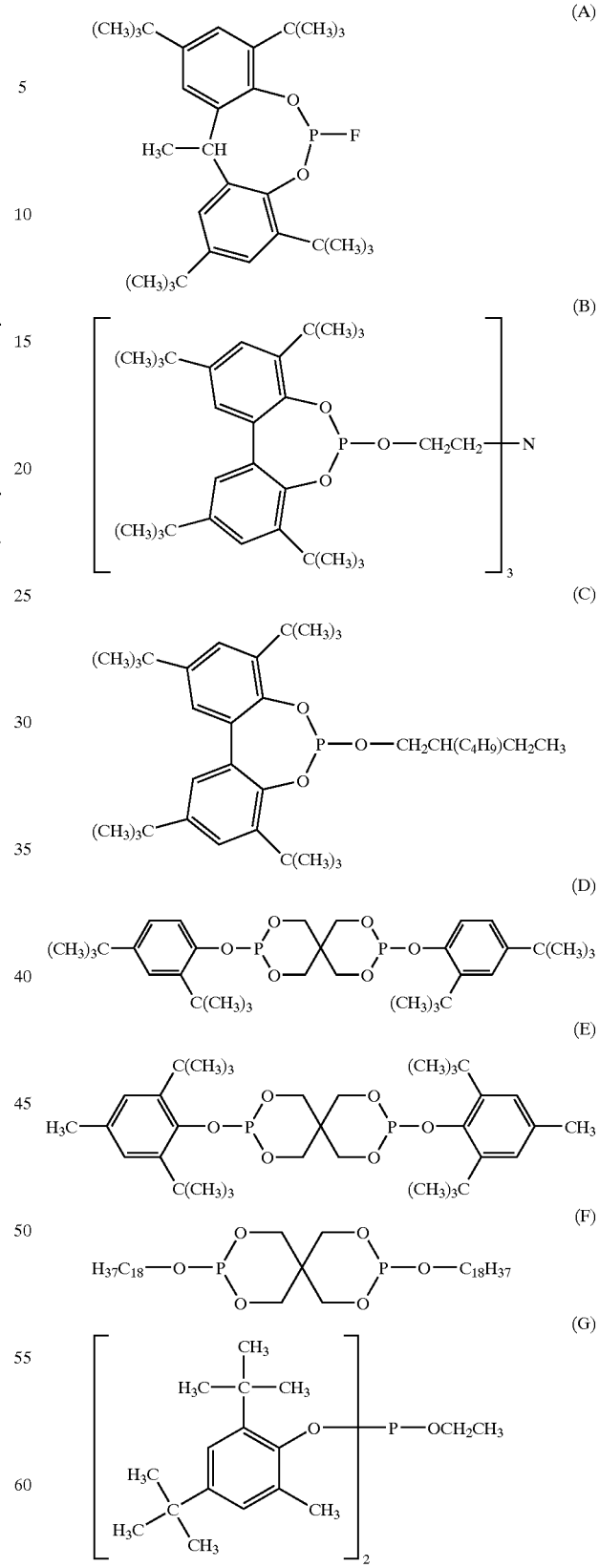

5. Hydroxylamines, for example N,N-dibenzylhydroxylamine, N,N-diethylhydroxylamine, N,N-dioctylhydroxylamine, N,N-dilaurylhydroxylamine, N,N- ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecyinitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

10. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

11. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

12. Other additives, for example plasticisers, lubricants, emulsifiers, pigments, rheology additives, catalysts, flow-control agents, optical brighteners, flameproofing agents, antistatic agents and blowing agents.

13. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

The above mentioned further stabilizers and additives are usually applied in an amount from 0.01% to 2%.

Also subject of the invention is therefore a polyolefin composition as described above which contains additionally a further stabilizer selected from the group consisting of a phenolic antioxidant, a phosphite or phosphonite and benzofuranone or indolinone.

The above mentioned components a, b, c and further additives can be incorporated into the polyolefin to be stabilized by known methods, for example before or during shaping or by applying the dissolved or dispersed compounds to the polyolefin, if necessary with subsequent evaporation of the solvent. The components can be added to the polyolefin in the form of a powder, granules or a masterbatch, which contains these components in, for example, a concentration of from 2.5 to 25% by weight.

If desired, the components can be melt blended with each other before incorporation in the polyolefin. They can also be added to the polyolefin before or during the polymerization.

The materials stabilized according to this invention can be used in a wide variety of forms, for example as films, fibres, tapes, moulding compositions or profiles.

Examples of processing or transformation of the polyolefin according to the present invention are:

Injection blow molding, extrusion, blow molding, rotomolding, in mold decoration (back injection), slush molding, injection molding, co-injection molding, forming, compression molding, pressing, film extrusion (cast film; blown film), fiber spinning (woven, non-woven), drawing (uniaxial, biaxial), annealing, deep drawing, calandering, mechanical transformation, sintering, coextrusion, coating, lamination, crosslinking (radiation, peroxide, silane), vapor deposition, weld together, glue, thermoforming, pipe extrusion, profile extrusion, sheet extrusion, extrusion coating, visbreaking (peroxide, thermal), fiber melt blown, spun bonded, surface treatment (corona discharge, flame, plasma), sterilization (by gamma rays, electron beams), cast polymerization (R&M process, RAM extrusion), gel-coating and tape extrusion.

The polyolefin according to the present invention may be used for the preparation of:

I-1) Floating devices, marine applications, pontoons, buoys, plastic lumber for decks, piers, boats, kayaks, oars, and beach reinforcements.

I-2) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-3) Road traffic devices, in particular sign postings, posts for road marking, car accessories, warning triangles, medical cases, helmets, tires.

I-4) Devices for plane, railway, motor car (car, motorbike) including furnishings.

I-5) Devices for space applications, in particular rockets and satellites, e.g. reentry shields.

I-6) Devices for architecture and design, mining applications, acoustic quietized systems, street refuges, and shelters.

II-1) Appliances, cases and coverings in general and electric/electronic devices (personal computer, telephone, handy, printer, television-sets, audio and video devices), flower pots, satellite TV bowl, and panel devices.

II-2) Jacketing for other materials such as steel or textiles.

II-3) Devices for the electronic industry, in particular insulation for plugs, especially computer plugs, cases for electric and electronic parts, printed boards, and materials for electronic data storage such as chips, check cards or credit cards.

II-4) Electric appliances, in particular washing machines, tumblers, ovens (microwave oven), dish-washers, mixers, and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts.

III-3) Sanitary articles, in particular shower cubicles, lavatory seats, covers, and sinks.

III-4) Hygienic articles, in particular diapers (babies, adult incontinence), feminine hygiene articles, shower curtains, brushes, mats, tubs, mobile toilets, tooth brushes, and bed pans.

III-5) Pipes (cross-linked or not) for water, waste water and chemicals, pipes for wire and cable protection, pipes for gas, oil and sewage, guttering, down pipes, and drainage systems.

III-6) Profiles of any geometry (window panes) and siding.

III-7) Glass substitutes, in particular extruded plates, glazing for buildings (monolithic, twin or multiwall), aircraft, schools, extruded sheets, window film for architectural glazing, train, transportation, sanitary articles, and greenhouse.

III-8) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles.

III-9) Intake and outlet manifolds.

III-10) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

IV-2) Woven fabrics continuous and staple, fibers (carpets/hygienic articles/geotextiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags.

IV-3) Membranes, insulation, covers and seals for roofs, tunnels, dumps, ponds, dumps, walls roofing membranes, geomembranes, swimming pools, curtains (shades)/sun-shields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

V) Films (packaging, dump, laminating, agriculture and horticulture, greenhouse, mulch, tunnel, silage), bale wrap, swimming pools, waste bags, wallpaper, stretch film, raffia, desalination film, batteries, and connectors.

VI-1) Food packing and wrapping (flexible and solid), BOPP, BOPET, bottles.

VI-2) Storage systems such as boxes (crates), luggage, chest, household boxes, pallets, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play vehicles.

VII-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china clay (kaolin), wollastonite, pigments, carbon black, $TiO_2$, mica, nanocomposites, dolomite, silicates, glass, asbestos).

Further aspects of the invention are a method for stabilizing a polyolefin containing at least one organic pigment against degradation induced by light, heat or oxidation, which comprises incorporating into the pigmented polyolefin a stabilizer mixture comprising a) at least one sterically hindered amine light stabilizer and
b) as UV absorber a mixture of a 2-hydroxyphenyl benzo-triazole and a 2-hydroxyphenyl-s-triazine, and the use of a mixture of
a) at least one sterically hindered amine light stabilizer and
b) as UV absorber a mixture of a 2-hydroxyphenyl benzotriazole and a 2-hydroxyphenyl-s-triazine for the stabilization of a polyolefin containing at least one organic pigment.

Definitions and preferences have already been given. They apply also for the method of stabilization and the use of the stabilizer mixture.

The following examples illustrate the invention.

Example 1

Light Stabilization of PP Homopolymer Films 100 parts of unstabilized polypropylene powder (melt flow index 3.8 g/10 minutes, 230° C./2160 g) are homogenized at 200° C. for 10 minutes in a Brabender plastograph with 0.05 parts of pentaerythrityl-tetrakis-3-(3,5-ditert.butyl-4-hydroxyphenyl)-propionate, 0.05 parts of tris-(2,4-di-tert.butylphenyl)-phosphite and the amount of coadditive, pigment and light stabilizer indicated in the table. The material thus obtained is compression molded in a laboratory press between two aluminum foils for 6 minutes at 260° C. to a 0.5 mm thick film which is cooled immediately to room temperature in a water-cooled press. Samples of 60×25 mm are cut out of these 0.5 mm films and exposed in a WEATHER-OMETER Ci 65 (black panel temperature 63±2° C., without water-spraying)

Periodically, these samples are removed from the exposure apparatus and their carbonyl content is measured with an infrared spectrophotometer.

The exposure time corresponding to formation of a carbonyl absorbance of 0.1 is a measure for the stabilizing efficiency of the light stabilizer. The values obtained are summarized in Table 1.

TABLE 1

Light stability of PP films containing an organic and an inorganic pigment
All the formulations contain: 0.1% TINUVIN 770 +
0.1% Mg stearate + 0.25% TiO$_2$(Rutile)

| Organic pigments and UV absorbers | $T_{0.1}$: (h) to 0.1 carbonyl absorbance | $\frac{(T_{0.1})_A + (T_{0.1})_B}{2}$ :(h) |
|---|---|---|
| 0.25% CHROMOPHTAL YELLOW 3G | | |
| Control (no UV absorber) | 770 | |
| 0.10% TINUVIN 327 | 960 | |
| 0.10% TINUVIN 1577 | 840 | |
| 0.05% TINUVIN 327 + 0.05% TINUVIN 1577 | 1000 | 900 |
| 0.25% CHROMOPHTAL RED BRN | | |
| Control (no UV absorber) | 1750 | |
| 0.10% TINUVIN 327 | 2045 | |
| 0.10% TINUVIN 1577 | 1990 | |
| 0.05% TINUVIN 327 + 0.05% TINUVIN 1577 | 2125 | 2018 |
| 0.25% CHROMOPHTAL DPP RED BOC | | |
| Control (no UV absorber) | 7140 | |
| 0.10% TINUVIN 327 | 6895 | |
| 0.10% TINUVIN 1577 | 8155 | |
| 0.05% TINUVIN 327 + 0.05% TINUVIN 1577 | 9040 | 7525 |

Example 2

Light Stabilization of PP Homopolymer Films 100 parts of unstabilized polypropylene powder (melt flow index 3.4 g/ 10 minutes, 230° C./2160 g) are homogenized at 200° C. for 10 minutes in a Brabender plastograph with 0.05 parts of pentaerythrityl-tetrakis-3-(3,5-ditert.butyl-4-hydroxyphenyl)-propionate, 0.05 parts of tris-(2,4-di-tert.butylphenyl)-phosphite and the amount of coadditive, pigment and light stabilizer indicated in the table. The material thus obtained is compression molded in a laboratory press between two aluminum foils for 6 minutes at 260° C. to a 0.5 mm thick film which is cooled immediately to room temperature in a water-cooled press. Samples of 60×25 mm are cut out of these 0.5 mm films and exposed in a WEATHER-OMETER Ci 65 (black panel temperature 63±2° C., without water-spraying)

Periodically, these samples are removed from the exposure apparatus and their carbonyl content is measured with an infrared spectrophotometer.

The exposure time corresponding to formation of a carbonyl absorbance of 0.1 is a measure for the stabilizing efficiency of the light stabilizer. The values obtained are summarized in Tables 2 and 3.

TABLE 2

Light stability of PP films containing organic pigments
All the formulations contain: 0.1% TINUVIN 770 +
0.1% Ca stearate

| Pigment and Light stabilization | $T_{0.1}$ (h) | $\frac{(T_{0.1})_A + (T_{0.1})_B}{2}$ (h) |
|---|---|---|
| 0.25% Chromophtal Yellow 2RLP | | |
| 0.1% TINUVIN 327 | 2073 | |
| 0.1% TINUVIN 1577 | 2340 | |
| 0.05% TINUVIN 327 + 0.05% TINUVIN 1577 | 2275 | 2207 |
| 0.25% Chromophtal Yellow GT-AD | | |
| 0.1% TINUVIN 327 | 5125 | |
| 0.1% TINUVIN 1577 | 6503 | |
| 0.05% TINUVIN 327 + 0.05% TINUVIN 1577 | 5918 | 5814 |
| 0.25% Chromophtal DPP Orange TRP | | |
| 0.1% TINUVIN 327 | 3072 | |
| 0.1% TINUVIN 1577 | 4668 | |
| 0.05% TINUVIN 327 + 0.05% TINUVIN 1577 | 4019 | 3870 |
| 0.25% Irgazin DPP Rubine TR | | |
| 0.1% TINUVIN 327 | 8565 | |
| 0.1% TINUVIN 1577 | 11868 | |
| 0.05% TINUVIN 327 + 0.05% TINUVIN 1577 | 10731 | 10216 |
| 0.25% Cinquasia Red Y RT 759-D | | |
| 0.1% TINUVIN 327 | 7690 | |
| 0.1% TINUVIN 1577 | 8509 | |
| 0.05% TINUVIN 327 + 0.05% TINUVIN 1577 | 9285 | 8100 |
| 0.25% Cinquasia Red B RT 195-D | | |
| 0.1% TINUVIN 327 | 4065 | |
| 0.1% TINUVIN 1577 | 6421 | |
| 0.05% TINUVIN 327 + 0.05% TINUVIN 1577 | 5898 | 5243 |
| 0.25% IRGALITE Green GFNP | | |
| 0.1% TINUVIN 327 | 4009 | |
| 0.1% TINUVIN 1577 | 6393 | |
| 0.05% TINUVIN 327 + 0.05% TINUVIN 1577 | 5561 | 5201 |

TABLE 2-continued

Light stability of PP films containing organic pigments
All the formulations contain: 0.1% TINUVIN 770 + 0.1% Ca stearate

| Pigment and Light stabilization | $T_{0.1}$ (h) | $\frac{(T_{0.1})_A + (T_{0.1})_B}{2}$ (h) |
|---|---|---|
| 0.25% Chromophtal Orange GL | | |
| 0.1% TINUVIN 327 | 2851 | |
| 0.1% TINUVIN 1577 | 3388 | |
| 0.05% TINUVIN 327 + 0.05% TINUVIN 1577 | 3462 | 3120 |
| 0.25% IRGAZIN Red BPTN | | |
| 0.1% TINUVIN 327 | 4883 | |
| 0.1% TINUVIN 1577 | 4953 | |
| 0.05% TINUVIN 327 + 0.05% TINUVIN 1577 | 5034 | 4918 |

TABLE 3

Light stability of PP films containing an organic and an inorganic pigment
All the formulations contain: 0.1% TINUVIN 770 + 0.1% Mg stearate + 0.25% TiO2

| Pigment and Light stabilization | $T_{0.1}$ (h) | $\frac{(T_{0.1})_A + (T_{0.1})_B}{2}$ (h) |
|---|---|---|
| 0.25% Chromophtal Yellow GT-AD | | |
| 0.1% TINUVIN 327 | 5837 | |
| 0.1% TINUVIN 1577 | 6052 | |
| 0.05% TINUVIN 327 + 0.05% TINUVIN 1577 | 6002 | 5945 |
| 0.25% Chromophtal Orange 2G | | |
| 0.1% TINUVIN 327 | 1614 | |
| 0.1% TINUVIN 1577 | 1739 | |
| 0.05% TINUVIN 327 + 0.05% TINUVIN 1577 | 1802 | 1677 |
| 0.25% Chromophtal DPP Red BOC | | |
| 0.1% TINUVIN 327 | 4618 | |
| 0.1% TINUVIN 1577 | 8167 | |
| 0.05% TINUVIN 327 + 0.05% TINUVIN 1577 | 7897 | 6392 |
| 0.25% Chromophtal Red 2030 | | |
| 0.1% TINUVIN 327 | 3692 | |
| 0.1% TINUVIN 1577 | 5149 | |
| 0.05% TINUVIN 327 + 0.05% TINUVIN 1577 | 4928 | 4420 |
| 0.25% Irgazin DPP Rubine TR | | |
| 0.1% TINUVIN 327 | 10087 | |
| 0.1% TINUVIN 1577 | 12202 | |
| 0.05% TINUVIN 327 + 0.05% TINUVIN 1577 | 11582 | 11144 |
| 0.25% Cinquasia Red Y RT 759-D | | |
| 0.1% TINUVIN 327 | 8417 | |
| 0.1% TINUVIN 1577 | 10155 | |
| 0.05% TINUVIN 327 + 0.05% TINUVIN 1577 | 9451 | 9286 |
| 0.25% Irgalite Blue BSP | | |
| 0.1% TINUVIN 327 | 5028 | |
| 0.1% TINUVIN 1577 | 7129 | |
| 0.05% TINUVIN 327 + 0.05% TINUVIN 1577 | 6402 | 6078 |
| 0.25% Chromophtal Blue A3R | | |
| 0.1% TINUVIN 327 | 7376 | |
| 0.1% TINUVIN 1577 | 9456 | |
| 0.05% TINUVIN 327 + 0.05% TINUVIN 1577 | 9120 | 8416 |
| 0.25% IRGALITE Green GFNP | | |
| 0.1% TINUVIN 327 | 3827 | |
| 0.1% TINUVIN 1577 | 6360 | |
| 0.05% TINUVIN 327 + 0.05% TINUVIN 1577 | 5911 | 5094 |
| 0.25% IRGAZIN Red BPTN | | |
| 0.1% TINUVIN 327 | 5279 | |
| 0.1% TINUVIN 1577 | 6525 | |
| 0.05% TINUVIN 327 + 0.05% TINUVIN 1577 | 6180 | 5902 |

Example 3

Light Stabilization of PP Homopolymer Films 100 parts of unstabilized polypropylene powder (melt flow index 3.6 g/10 minutes, 230° C./2160 g) are homogenized at 200° C. for 10 minutes in a Brabender plastograph with 0.05 parts of pentaerythrityl-tetrakis-3-(3,5-ditert.butyl-4-hydroxyphenyl)-propionate, 0.05 parts of tris-(2,4-di-tert.butylphenyl)-phosphite, 0.1 parts of Ca stearate and the amount of pigment and light stabilizers indicated in the table. The material thus obtained is compression molded in a laboratory press between two aluminum foils for 6 minutes at 260° C. to a 0.5 mm thick film which is cooled immediately to room temperature in a water-cooled press. Samples of 60×25 mm are cut out of these 0.5 mm films and exposed in a WEATHER-OMETER Ci 65 (black panel temperature 63±2° C., without water-spraying)

Periodically, these samples are removed from the exposure apparatus and their carbonyl content is measured with an infrared spectrophotometer.

The exposure time corresponding to formation of a carbonyl absorbance of 0.1 is a measure for the stabilizing efficiency of the light stabilizer. The values obtained are summarized in Tables 4 and 5.

TABLE 4

Light stability of PP films containing an organic pigment
All the formulations contain: 0.25% Chromophtal DPP Red BOC + 0.1% CHIMASSORB 944

| Light stabilization | $T_{0.1}$ (h) | $\frac{(T_{0.1})_A + (T_{0.1})_B}{2}$ (h) |
|---|---|---|
| 0.1% TINUVIN 327 | 2667 | |
| 0.2% TINUVIN 327 | 2728 | |
| 0.1% TINUVIN 1577 | 3235 | |
| 0.2% TINUVIN 1577 | 3718 | |
| 0.05% TINUVIN 327 + 0.05% TINUVIN 1577 | 3284 | 2951 |

TABLE 4-continued

Light stability of PP films containing an organic pigment
All the formulations contain: 0.25% Chromophthal DPP Red BOC +
0.1% CHIMASSORB 944

| Light stabilization | $T_{0.1}$ (h) | $\frac{(T_{0.1})_A + (T_{0.1})_B}{2}$ (h) |
|---|---|---|
| 0.075% TINUVIN 327 + 0.025% TINUVIN 1577 | 3081 | 2809 |
| 0.1% TINUVIN 327 + 0.1% TINUVIN 1577 | 3588 | 3223 |
| 0.15% TINUVIN 327 + 0.05% TINUVIN 1577 | 3008 | 2975 |

TABLE 5

Light stability of PP films containing an organic pigment
All the formulations contain: 0.25% Chromophthal DPP Red BOC +
0.1% TINUVIN 770

| Light stabilization | $T_{0.1}$ (h) | $\frac{(T_{0.1})_A + (T_{0.1})_B}{2}$ (h) |
|---|---|---|
| 0.1% TINUVIN 327 | 3280 | |
| 0.2% TINUVIN 327 | 3976 | |
| 0.1% TINUVIN 1577 | 5969 | |
| 0.2% TINUVIN 1577 | 7255 | |
| 0.05% TINUVIN 327 + 0.05% TINUVIN 1577 | 4730 | 4624 |
| 0.075% TINUVIN 327 + 0.025% TINUVIN 1577 | 4623 | 3952 |
| 0.1% TINUVIN 327 + 0.1% TINUVIN 1577 | 5757 | 5615 |
| 0.15% TINUVIN 327 + 0.05% TINUVIN 1577 | 5215 | 4796 |

Pigments and chemical classes:

| Trade name | Chemical description | C.I.-designation |
|---|---|---|
| CHROMOPHTHAL Yellow 3G | Disazo condensation | Pigment Yellow 93 |
| CHROMOPHTHAL Red BRN | Disazo condensation | Pigment Red 144 |
| CHROMOPHTHAL DPP Red BOC | Diketopyrrolo-pyrrole | Pigment Red 254 |
| CHROMOPHTHAL Red 2030 | Diketopyrrolo-pyrrole | Pigment Red 254 |
| CHROMOPHTAL Yellow 2RLP | Isoindolinone | Pigment Yellow 110 |
| CHROMOPHTAL Yellow GT-AD | Anthraquinone | Pigment Yellow 199 |
| CHROMOPHTAL DPP Orange TRP | Diketopyrrolo-pyrrole | Pigment Orange 71 |
| IRGAZIN DPP Rubine TR | Diketopyrrolo-pyrrole | Pigment Red 272 |
| CINQUASIA Red Y RT-759-D | Quinacridone | Pigment Violet 19 |
| CINQUASIA Red B RT 195-D | Quinacridone | — |
| IRGALITE Blue BSP | Cu-phthalocyanine, stabilized α-form | Pigment Blue 15:1 |
| CHROMOPHTAL Blue A3R | Anthraquinone | Pigment Blue 60 |
| IRGALITE Green GFNP | Cu-phthalocyanine | Pigment Green 7 |
| CHROMOPHTAL Orange GL | Benzimidazolone | Pigment Orange 64 |
| IRGAZIN Red BPTN | Perylene | Pigment Red 224 |
| CHROMOPHTAL Orange 2G | Isoindolinone | Pigment Orange 61 |

All UV-absorbers and light stabilizers as well as all pigments used are registered trade marks and commercial products of Ciba Specialty Chemicals Corp.

What is claimed is:

1. A polyolefin composition which comprises
   a) at least one organic pigment
   b) at least one sterically hindered amine light stabilizer and
   c) as UV absorber a mixture of
      a 2-hydroxyphenyl benzotriazole and a 2-hydroxyphenyl-s-triazine wherein the weight ratio of hydroxyphenyl triazine UV-absorber to hydroxyphenyl benzotriazole UV-absorber is from 10:1 to 1:10.

2. A polyolefin composition according to claim 1 wherein the polyolefin is polypropylene, polyethylene or a copolymer thereof.

3. A polyolefin composition according to claim 1 wherein the pigment is selected from the group comprising the classes of azo pigments, anthraquinones, benzimidazolones, dioxazines, phthalocyanines, tetrachloroisoindolinones, quinacridones, isoindolines, perylenes, pyrrolopyrroles.

4. A polyolefin composition according to claim 1 wherein the UV-absorber of the class of hydroxyphenyl-s-triazine is of formula (I)

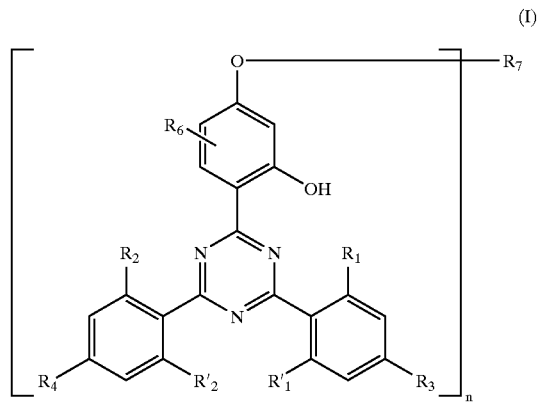

(I)

in which n is 1 or 2;

$R_1$, $R'_1$, $R_2$ and $R'_2$, independently of one another, are H, OH, $C_1$–$C_{12}$alkyl; $C_2$–$C_6$alkenyl; $C_1$–$C_{12}$alkoxy; $C_2$–$C_{18}$alkenoxy; halogen; trifluoromethyl; $C_7$–$C_{11}$phenylalkyl; phenyl; phenyl which is substituted by $C_1$–$C_{18}$alkyl, $C_1$–$C_{18}$alkoxy or halogen; phenoxy; or phenoxy which is substituted by $C_1$–$C_{18}$alkyl, $C_1$–$C_{18}$alkoxy or halogen;

$R_3$ and $R_4$, independently of one another, are H, $C_1$–$C_{12}$alkyl; $OR'_7$; $C_2$–$C_6$alkenyl; $C_2$–$C_{18}$alkenoxy; halogen; trifluoromethyl; $C_7$–$C_{11}$phenylalkyl; phenyl; phenyl which is substituted by $C_1$–$C_{18}$alkyl, $C_1$–$C_{18}$alkoxy or halogen; phenoxy; or phenoxy which is substituted by $C_1$–$C_{18}$alkyl, $C_1$–$C_{18}$alkoxy or halogen;

$R_6$ is hydrogen, $C_1$–$C_{24}$alkyl, $C_5$–$C_{12}$cycloalkyl or $C_7$–$C_{15}$phenylalkyl;

$R_7$, in the case where n=1, and $R'_7$, independently of one another, are hydrogen or $C_1$–$C_{18}$alkyl; or are $C_1$–$C_{12}$alkyl which is substituted by OH, $C_1$–$C_{18}$alkoxy, allyloxy, halogen, —COOH, —COOR$_6$, —CONH$_2$, —CONHR$_9$, —CON(R$_9$)(R$_{10}$), —NH$_2$, —NHR$_9$, —N(R$_9$)(R$_{10}$), —NHCOR$_{11}$, —CN, —OCOR$_{11}$, phenoxy and/or phenoxy which is substituted by $C_1$–$C_{18}$alkyl, $C_1$–$C_{18}$alkoxy or halogen; or $R_7$ is $C_3$–$C_{50}$alkyl which is interrupted by —O— and may be substituted by OH; or $R_7$ is $C_3$–$C_6$alkenyl; glycidyl;

$C_5$–$C_{12}$cycloalkyl; cyclohexyl which is substituted by OH, $C_1$–$C_4$alkyl or —$OCOR_{11}$; $C_7$–$C_{11}$phenylalkyl which is unsubstituted or substituted by OH, Cl or $CH_3$; —CO—$R_{12}$ or —$SO_2$—$R_{13}$;

$R_7$, in the case where n=2, is $C_2$–$C_{16}$alkylene, $C_4$–$C_{12}$alkenylene, xylylene, $C_3$–$C_{20}$alkylene which is interrupted by O and/or substituted by OH, or is a group of the formula —$CH_2CH(OH)CH_2O$—$R_{20}$—$OCH_2CH(OH)CH_2$—, —CO—$R_{21}$—CO—, —CO—NH—$R_{22}$—NH—CO— or —$(CH_2)_m$—COO—$R_{23}$—OOC—$(CH_2)_m$—, in which m is a number in the range from 1 to 3, or is

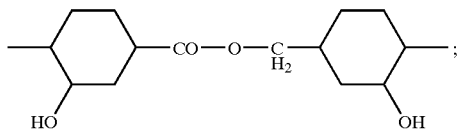

$R_8$ is $C_1$–$C_{18}$alkyl; $C_2$–$C_{18}$alkenyl; hydroxyethyl; $C_3$–$C_{50}$alkyl which is interrupted by O, NH, $NR_9$ or S and/or is substituted by OH; $C_1$–$C_4$alkyl which is substituted by —$P(O)(OR_{14})_2$, —$N(R_9)(R_{10})$ or —$OCOR_{11}$ and/or OH; glycidyl; $C_5$–$C_{12}$cycloalkyl; phenyl; $C_7$–$C_{14}$alkylphenyl or $C_7$–$C_{11}$ phenylalkyl;

$R_9$ and $R_{10}$, independently of one another, are $C_1$–$C_{12}$alkyl; $C_3$–$C_{12}$alkoxyalkyl; $C_4$–$C_{16}$dialkylaminoalkyl or $C_5$–$C_{12}$cycloalkyl, or $R_9$ and $R_{10}$ together are $C_3$–$C_9$alkylene or -oxaalkylene or -azaalkylene;

$R_{11}$ is $C_1$–$C_{18}$alkyl; $C_2$–$C_{18}$alkenyl or phenyl; $C_2$–$C_{12}$hydroxyalkyl; cyclohexyl; or is $C_3$–$C_{50}$alkyl which is interrupted by —O— and may be substituted by OH;

$R_{12}$ is $C_1$–$C_{18}$alkyl; $C_2$–$C_{18}$alkenyl; phenyl; $C_1$–$C_{18}$alkoxy; $C_3$–$C_{18}$alkenyloxy; $C_3$–$C_{50}$alkoxy which is interrupted by O, NH, $NR_9$ or S and/or substituted by OH; cyclohexyloxy; $C_7$–$C_{14}$alkylphenoxy; $C_7$–$C_{11}$phenylalkoxy; phenoxy; $C_1$–$C_{12}$alkylamino; phenylamino; tolylamino or naphthylamino;

$R_{13}$ is $C_1$–$C_{12}$alkyl; phenyl; naphthyl or $C_7$–$C_{14}$alkylphenyl;

$R_{14}$ is $C_1$–$C_{12}$alkyl, methylphenyl or phenyl;

$R_{20}$ is $C_2$–$C_{10}$alkylene; $C_4$–$C_{50}$alkylene which is interrupted by O, phenylene or a -phenylene-X-phenylene- group, in which X is —O—, —S—, —$SO_2$—, —$CH_2$— or —$C(CH_3)_2$—;

$R_{21}$ is $C_2$–$C_{10}$alkylene, $C_2$–$C_{10}$oxaalkylene, $C_2$–$C_{10}$thiaalkylene, $C_6$–$C_{12}$arylene or $C_2$–$C_6$alkenylene;

$R_{22}$ is $C_2$–$C_{10}$alkylene, phenylene, tolylene, diphenylenemethane or a

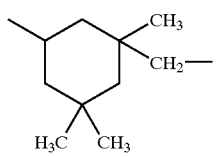

group; and $R_{23}$ is $C_2$–$C_{10}$alkylene or $C_4$–$C_{20}$alkylene which is interrupted by O.

5. A polyolefin composition according to claim 1 wherein the UV-absorber of the class of hydroxyphenyl benzotriazole is of formula IIa, IIb or IIc:

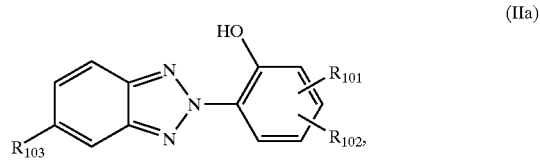

(IIa)

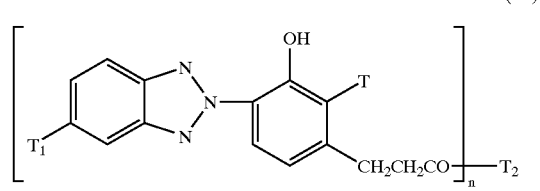

(IIb)

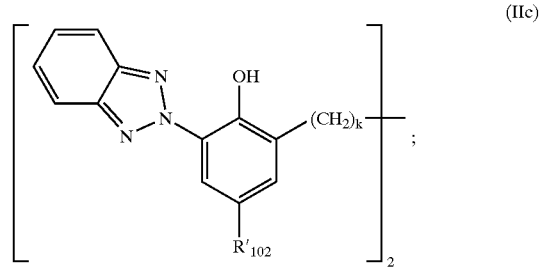

(IIc)

in the compounds of the formula (IIa), $R_{101}$ is hydrogen, alkyl having 1 to 24 carbon atoms, phenylalkyl having 1 to 4 carbon atoms in the alkyl moiety, cycloalkyl having 5 to 8 carbon atoms or a radical of the formula

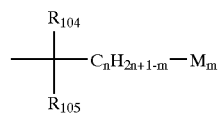

in which $R_{104}$ and $R_{105}$ independently of one another are alkyl having in each case 1 to 5 carbon atoms, or $R_{104}$, together with the radical $C_nH_{2n+1-m}$, forms a cycloalkyl radical having 5 to 12 carbon atoms, m is 1 or 2, n is an integer from 2 to 20 and M is a radical of the formula —$COOR_{106}$ in which $R_{106}$ is hydrogen, alkyl having 1 to 12 carbon atoms, alkoxyalkyl having in each case 1 to 20 carbon atoms in the alkyl moiety and in the alkoxy moiety or phenylalkyl having 1 to 4 carbon atoms in the alkyl moiety, $R_{102}$ is hydrogen, halogen, alkyl having 1 to 18 carbon atoms, and phenylalkyl having 1 to 4 carbon atoms in the alkyl moiety, and $R_{103}$ is hydrogen, chlorine, alkyl or alkoxy having in each case 1 to 4 carbon atoms or —$COOR_{106}$ in which $R_{106}$ is as defined above, at least one of the radicals $R_{101}$ and $R_{102}$ being other than hydrogen;

in the compounds of the formula (IIb)

T is hydrogen or alkyl having 1 to 6 carbon atoms, $T_1$ is hydrogen, chlorine or alkyl or alkoxy having in each case 1 to 4 carbon atoms, n is 1 or 2 and, if n is 1, $T_2$ is chlorine or a radical of the formula —$OT_3$ or $$-N\begin{matrix}T_4\\T_5\end{matrix}$$

and, if n is 2, $T_2$ is a radical of the formula $$\begin{matrix}\diagdown\\T_6\end{matrix}N-T_{10}-N\begin{matrix}\diagup\\T_6\end{matrix}$$

or —O-$T_9$-O— in which $T_3$ is hydrogen, alkyl which has 1 to 18 carbon atoms and is unsubstituted or substituted by 1 to 3 hydroxyl groups or by —$OCOT_6$, alkyl which has 3 to 18 carbon atoms, is interrupted once or several times by —O— or —$NT_6$- and is unsubstituted or substituted by hydroxyl or —$OCOT_6$, cycloalkyl which has 5 to 12 carbon atoms and is unsubstituted or substituted by hydroxyl and/or alkyl having 1 to 4 carbon atoms, alkenyl which has 2 to 18 carbon atoms and is unsubstituted or substituted by hydroxyl, phenylalkyl having 1 to 4 carbon atoms in the alkyl moiety, or a radical of the formula —$CH_2CH(OH)$-$T_7$ or $$-\underset{H_2}{C}-CH\overset{O}{\diagup\diagdown}CH_2,$$

$T_4$ and $T_5$ independently of one another are hydrogen, alkyl having 1 to 18 carbon atoms, alkyl which has 3 to 18 carbon atoms and is interrupted once or several times by —O— or —$NT_6$-, cycloalkyl having 5 to 12 carbon atoms, phenyl, phenyl which is substituted by alkyl having 1 to 4 carbon atoms, alkenyl having 3 to 8 carbon atoms, phenylalkyl having 1 to 4 carbon atoms in the alkyl moiety or hydroxyalkyl having 2 to 4 carbon atoms, $T_6$ is hydrogen, alkyl having 1 to 18 carbon atoms, cycloalkyl having 5 to 12 carbon atoms, alkenyl having 3 to 8 carbon atoms, phenyl, phenyl which is substituted by alkyl having 1 to 4 carbon atoms, phenylalkyl having 1 to 4 carbon atoms in the alkyl moiety, $T_7$ is hydrogen, alkyl having 1 to 18 carbon atoms, phenyl which is unsubstituted or substituted by hydroxyl, phenylalkyl having 1 to 4 carbon atoms in the alkyl moiety, or —$CH_2OT_8$, $T_8$ is alkyl having 1 to 18 carbon atoms, alkenyl having 3 to 8 carbon atoms, cycloalkyl having 5 to 10 carbon atoms, phenyl, phenyl which is substituted by alkyl having 1 to 4 carbon atoms, or phenylalkyl having 1 to 4 carbon atoms in the alkyl moiety, $T_9$ is alkylene having 2 to 8 carbon atoms, alkenylene having 4 to 8 carbon atoms, alkynylene having 4 carbon atoms, cyclohexylene, alkylene which has 2 to 8 carbon atoms and is interrupted once or several times by —O—, or a radical of the formula —$CH_2CH(OH)$ $CH_2OT_{11}OCH_2CH(OH)CH_2$— or —$CH_2$—C$(CH_2OH)_2$—$CH_2$—, $T_{10}$ is alkylene which has 2 to 20 carbon atoms and can be interrupted once or several times by —O—, or cyclohexylene, $T_{11}$ is alkylene having 2 to 8 carbon atoms, alkylene which has 2 to 18 carbon atoms and is interrupted once or several times by —O—, 1,3-cyclohexylene, 1,4-cyclohexylene, 1,3-phenylene or 1,4-phenylene, or $T_{10}$ and $T_6$, together with the two nitrogen atoms, are a piperazine ring;

in the compounds of formula (IIc)

$R'_{102}$ is $C_1$–$C_{12}$alkyl and k is a number from 1 to 4.

6. A polyolefin composition according to claim 1 wherein the total amount of UV absorber is from 0.01 to 5% by weight, based on the weight of the polyolefin.

7. A polyolefin composition according to claim 1 wherein the sterically hindered amine light stabilizer is selected from the group consisting of bis(2,2,6,6-tetramethyl-4-piperidyl) sebacate, bis(2,2,6,6-tetramethyl-4-piperidyl)succinate, bis (1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)-hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)-pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl) hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro-[4,5]decane and epichlorohydrin, 1,1-bis-(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl))siloxane, a reaction product of maleic acid anhydride-α-olefin copolymer with 2,2,6,6-tetramethyl-4-aminopiperidine or 1,2,2,6,6-pentamethyl-4-aminopiperidine.

8. A polyolefin composition according to claim 1 wherein the amount of the sterically hindered amine compound (component (c)) is preferably 0.005 to 5% by weight, based on the weight of the polymer.

9. A polyolefin composition according to claim 1 which contains additionally a further stabilizer selected from the group consisting of a phenolic antioxidant, a phosphite or phosphonite and benzofuranone or indolinone.

10. A polyolefin composition according to claim 1 which contains additionally an inorganic pigment.

11. A method for stabilizing a polyolefin containing at least one organic pigment against degradation induced by light, heat or oxidation, which comprises incorporating into the pigmented polyolefin a stabilizer mixture comprising
 a) at least one sterically hindered amine light stabilizer and
 b) as UV absorber a mixture of a 2-hydroxyphenyl benzotriazole and a 2-hydroxyphenyl-s-triazine wherein the weight ratio of hydroxyphenyl triazine UV-absorber to hydroxyphenyl benzotriazole UV-absorber is from 10:1 to 1:10.

* * * * *